(12) United States Patent
Kawaguchi et al.

(10) Patent No.: US 12,472,206 B2
(45) Date of Patent: Nov. 18, 2025

(54) PHARMACEUTICAL COMPOSITION CONTAINING CERIUM COMPOUND AS ACTIVE INGREDIENT

(71) Applicants: APPLAUSE PHARMA CO., LTD., Tokyo (JP); MITSUI MINING & SMELTING CO., LTD., Tokyo (JP)

(72) Inventors: Tsunetaka Kawaguchi, Tokyo (JP); Masaharu Nakatsu, Tokyo (JP); Yukihiro Ogawa, Tokyo (JP); Akiko Hashimoto, Tokyo (JP)

(73) Assignees: Applause Pharma Co., Ltd., Tokyo (JP); Mitsui Mining & Smelting Co., Ltd., Tokyo (JP)

( * ) Notice: Subject to any disclaimer, the term of this patent is extended or adjusted under 35 U.S.C. 154(b) by 313 days.

(21) Appl. No.: 18/153,124

(22) Filed: Jan. 11, 2023

(65) Prior Publication Data

US 2023/0233603 A1 Jul. 27, 2023

Related U.S. Application Data

(63) Continuation-in-part of application No. PCT/JP2021/017295, filed on Apr. 30, 2021.

(30) Foreign Application Priority Data

Jul. 13, 2020 (JP) .................................. 2020-119746

(51) Int. Cl.
*A61K 33/244* (2019.01)
*A61P 13/12* (2006.01)

(52) U.S. Cl.
CPC ............ *A61K 33/244* (2019.01); *A61P 13/12* (2018.01)

(58) Field of Classification Search
None
See application file for complete search history.

(56) References Cited

U.S. PATENT DOCUMENTS

| | | | |
|---|---|---|---|
| 5,968,976 | A | 10/1999 | Murrer et al. |
| 9,669,055 | B1* | 6/2017 | Blough ............... B01J 23/10 |
| 11,806,461 | B2 | 11/2023 | Oishi et al. |
| 2006/0047086 | A1* | 3/2006 | Albright .................. C08F 8/40 |
| | | | 525/360 |
| 2009/0074883 | A1 | 3/2009 | Gupta |
| 2011/0123604 | A1* | 5/2011 | Strickland ............ A61K 9/1688 |
| | | | 521/30 |
| 2014/0271899 | A1 | 9/2014 | Leiter et al. |
| 2016/0144005 | A1* | 5/2016 | Bernachon .............. A61P 13/02 |
| | | | 514/15.4 |
| 2018/0325832 | A1 | 11/2018 | Bell |
| 2018/0326141 | A1 | 11/2018 | Han et al. |
| 2021/0353845 | A1 | 11/2021 | Oishi et al. |

FOREIGN PATENT DOCUMENTS

| | | |
|---|---|---|
| CN | 109939125 | 6/2019 |
| JP | 62-011611 | 1/1987 |
| JP | 08-010610 | 1/1996 |
| JP | 11-503119 | 3/1999 |
| JP | 2007-022836 | 2/2007 |
| JP | 2016-514163 | 5/2016 |
| JP | 2018-508568 | 3/2018 |
| JP | 2020-045290 | 3/2020 |
| JP | 2020-045291 | 3/2020 |
| JP | 6664631 B | 3/2020 |
| TW | 201945040 | 12/2019 |
| WO | 2020/086496 | 4/2020 |

OTHER PUBLICATIONS

Extended European Search Report issued in corresponding European Patent Application No. 21842561.9, Jun. 12, 2024, 9 pages.
Ogura, Masahiro et al., "Development of non-aluminum phosphate binder. Hydrous cerium oxide—Hydrous cerium oxide", Journal of Artificial Organs, 1986, vol. 15, No. 3, pp. 1205-1207—Abstract.
Ogura, Masahiro et al., "Development of non-aluminum phosphate binder—Hydrous cerium oxide", Journal of the Japanese Society for Dialysis Therapy, 1986, vol. 19, No. 8, pp. 775-778—Abstract.
Saifi, M. A. et al. Protective Effect of Nanoceria on Cisplatin-induced Nephrotoxicity by Amelioration of Oxidative Stress and Pro-inflammatory Mechanisms. Biological Trace Element Research, 2019, vol. 189, pp. 145-156.
Miyakawa, Kazuki et al., "CeO2 nanoparticle hydrothermal synthesis with amino base for the production of nanocomposite materials", Proceedings of the 2015 SCEJ 80th Annual Meeting, 2015, XC237, pp. 1.
Search Report issued in International Application No. PCT/JP2021/017295, Jun. 22, 2021, 3 pages.

* cited by examiner

*Primary Examiner* — Robert A Wax
*Assistant Examiner* — William Craigo
(74) *Attorney, Agent, or Firm* — HSML P.C.

(57) ABSTRACT

Primarily aimed at providing a novel pharmaceutical composition. The present invention relates to a pharmaceutical composition that contains a cerium compound as an active ingredient.

2 Claims, 16 Drawing Sheets

[Fig. 1]
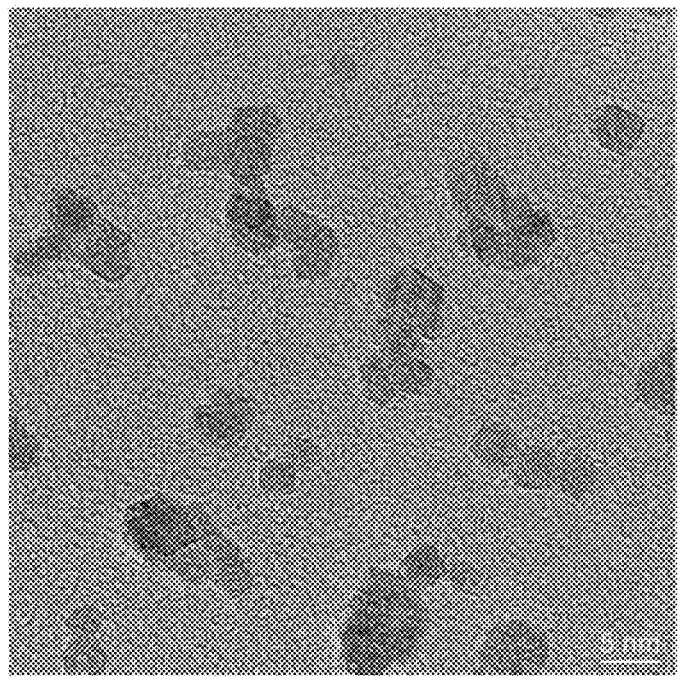
[Fig. 2]
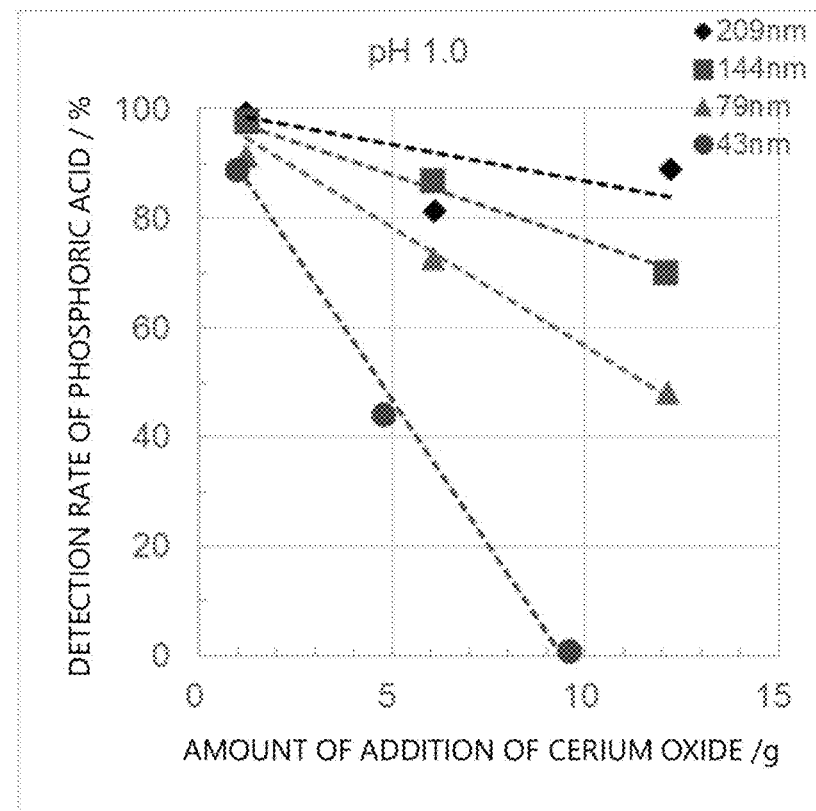

[Fig. 3]
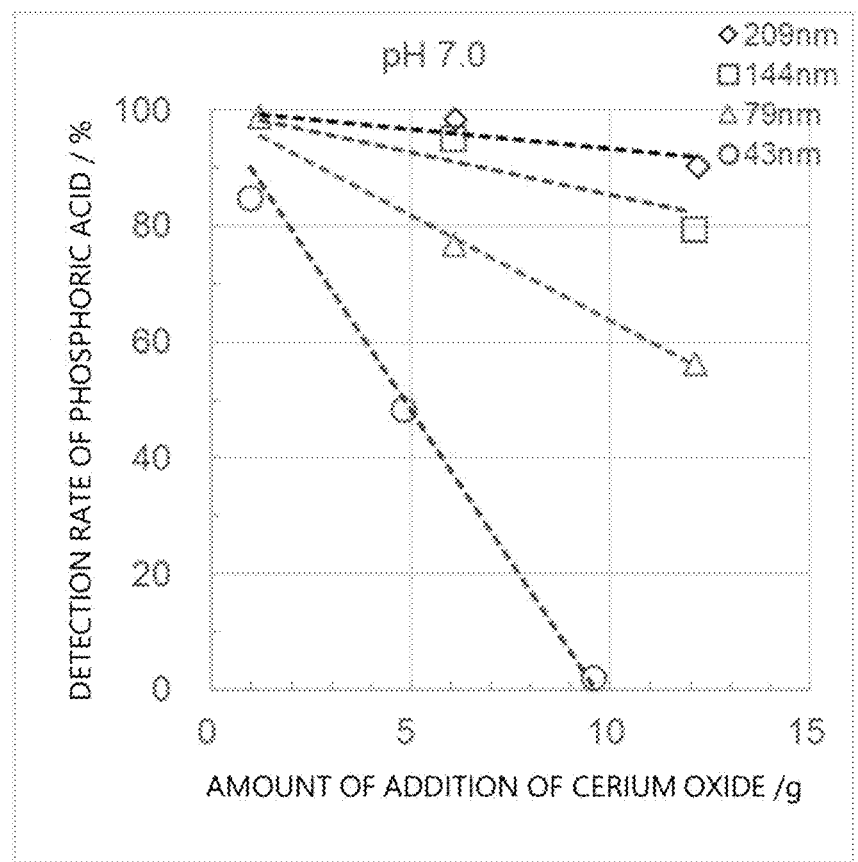

[Fig. 4]
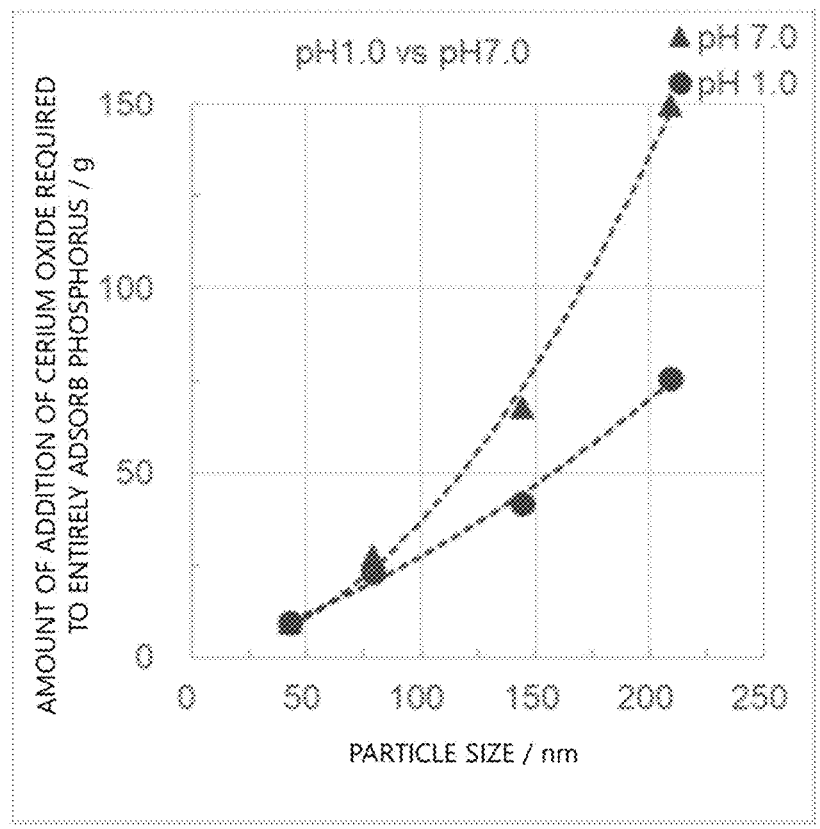

[Fig. 5]
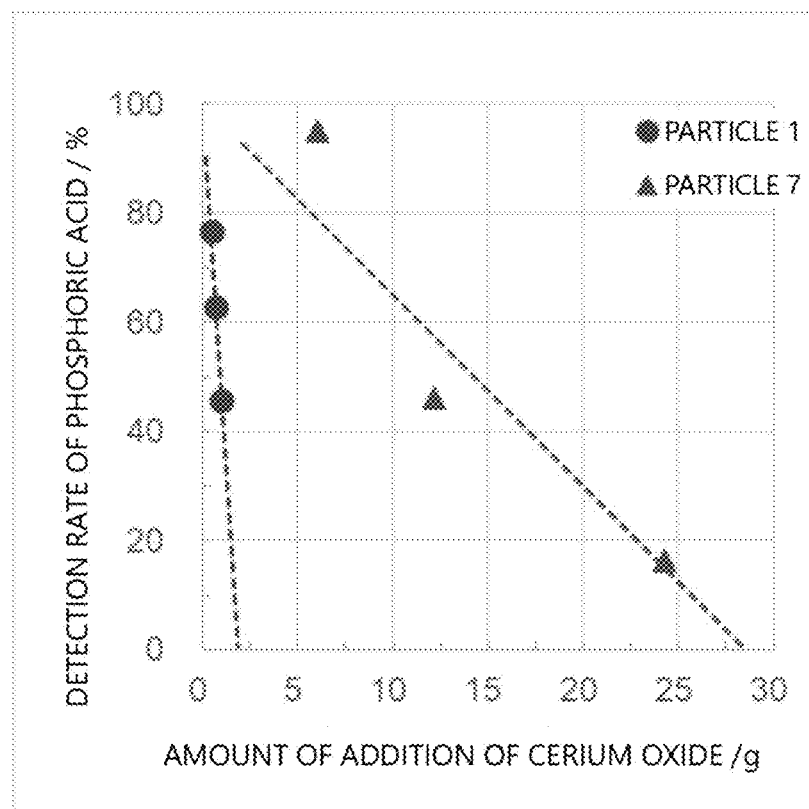

[Fig. 6]
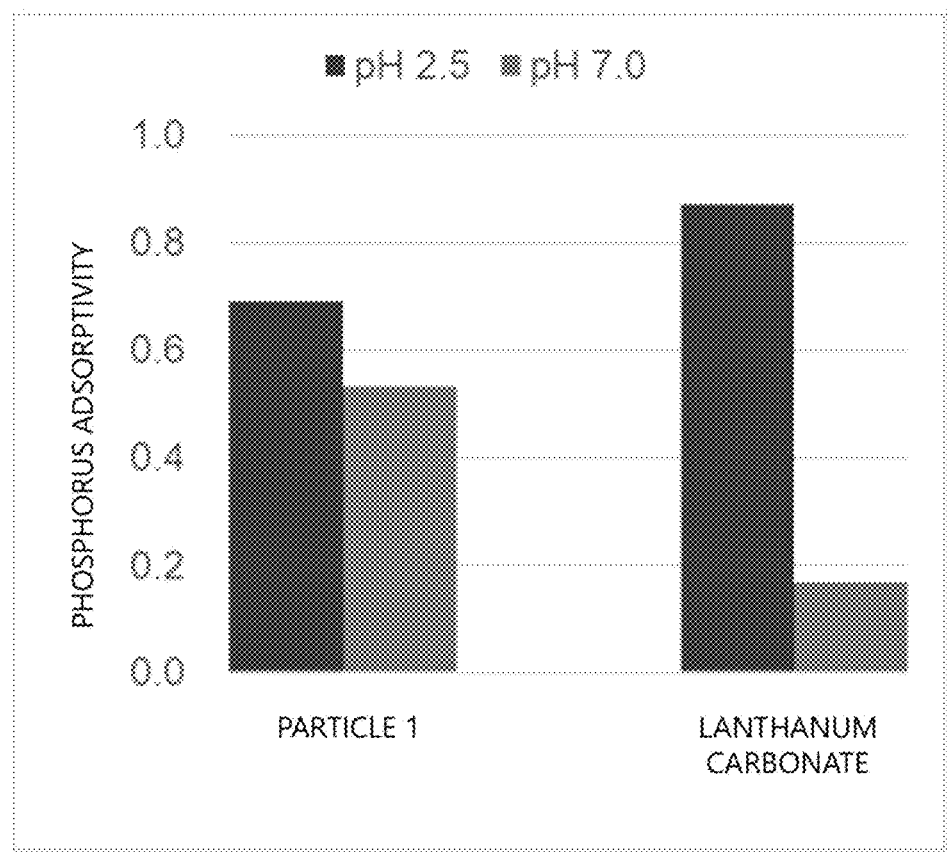

[Fig. 7]
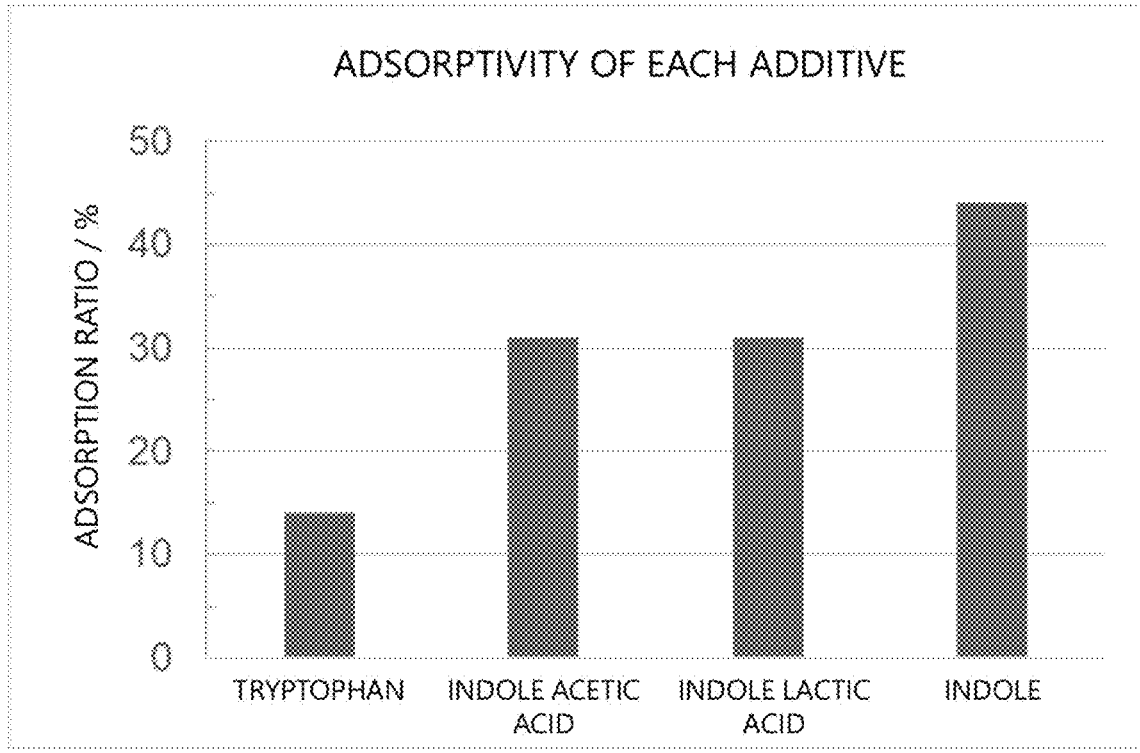
[Fig. 8]
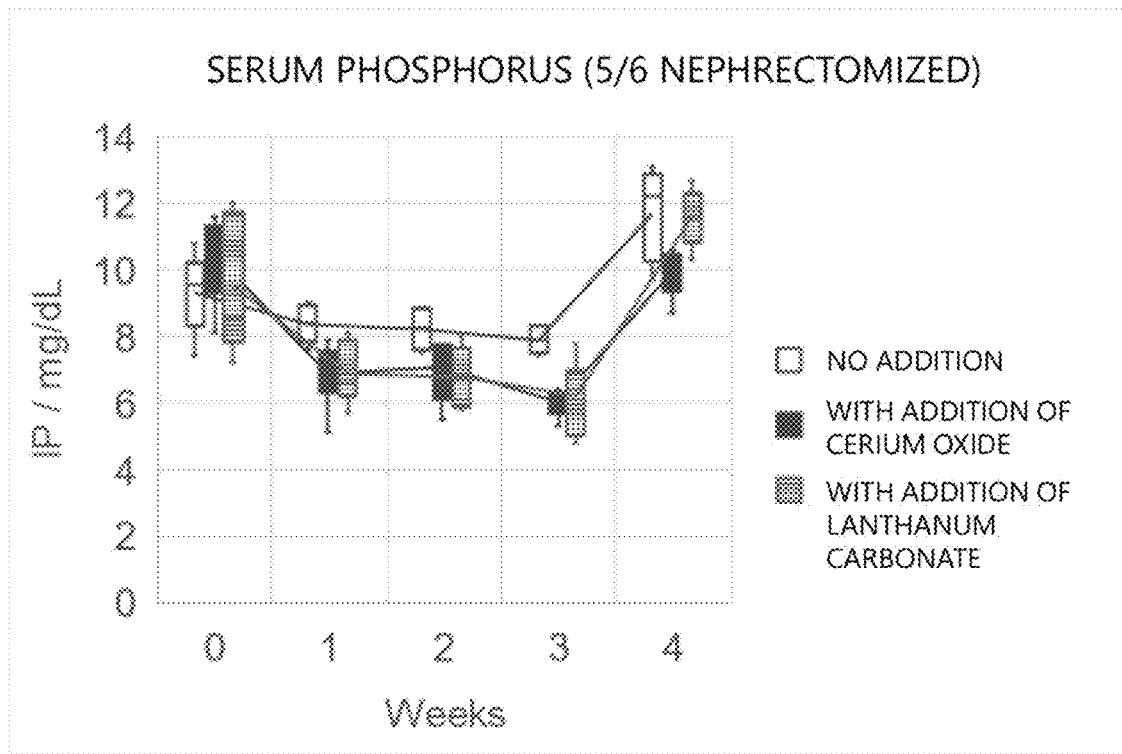

[Fig. 9]
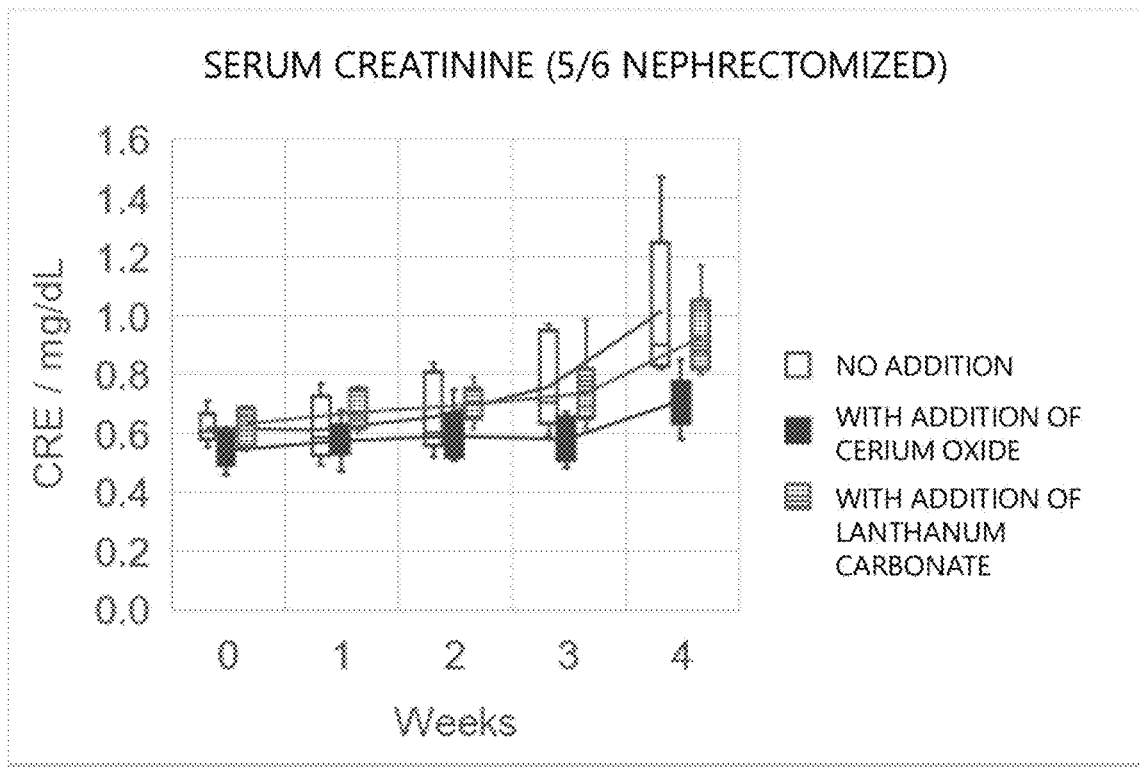
[Fig. 10]
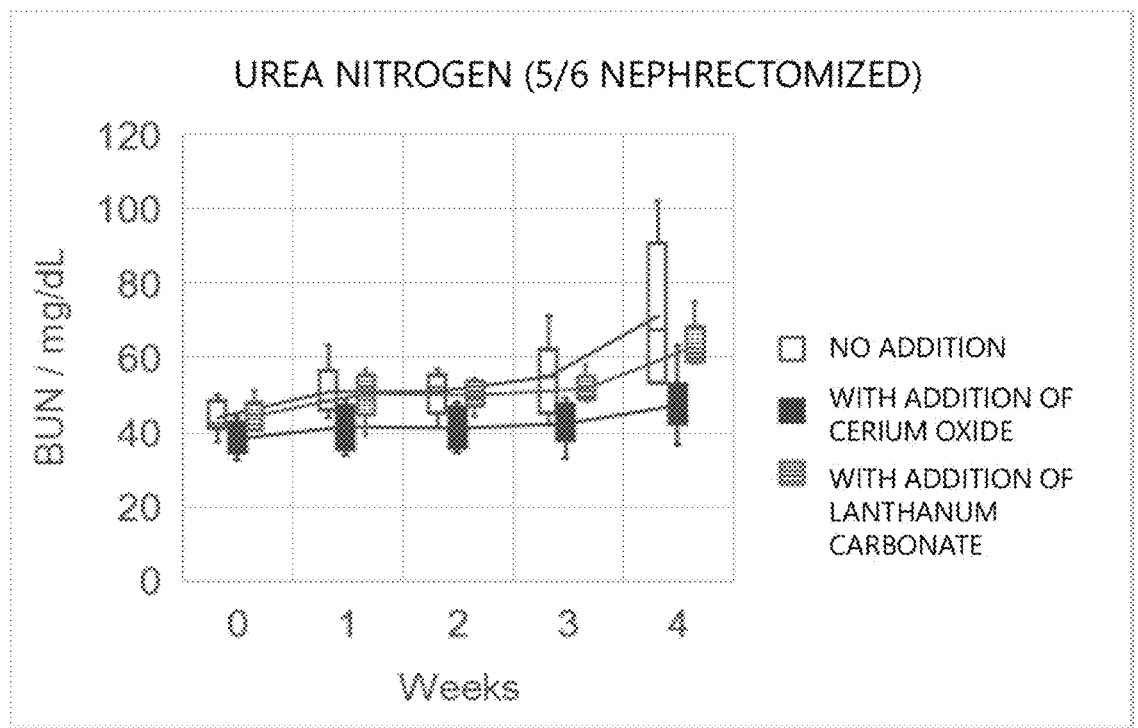

[Fig. 11]
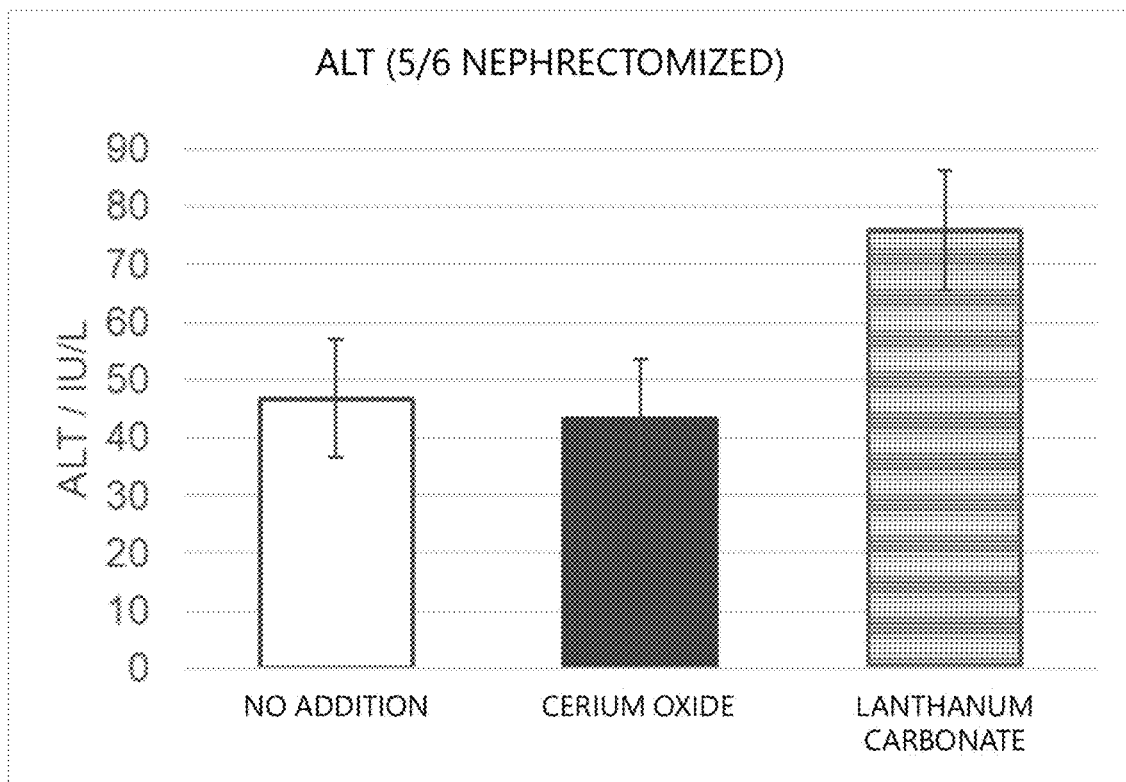
[Fig. 12]
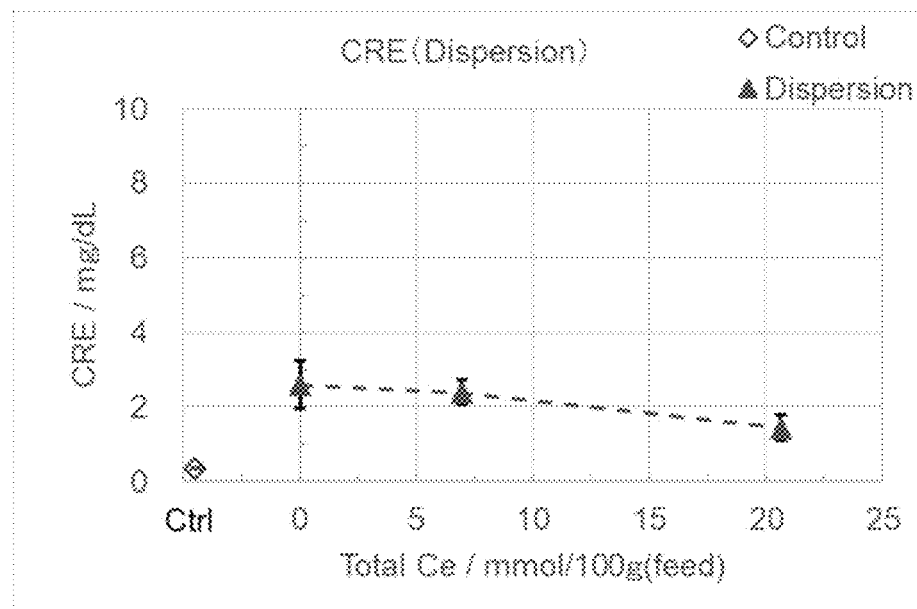

[Fig. 13]
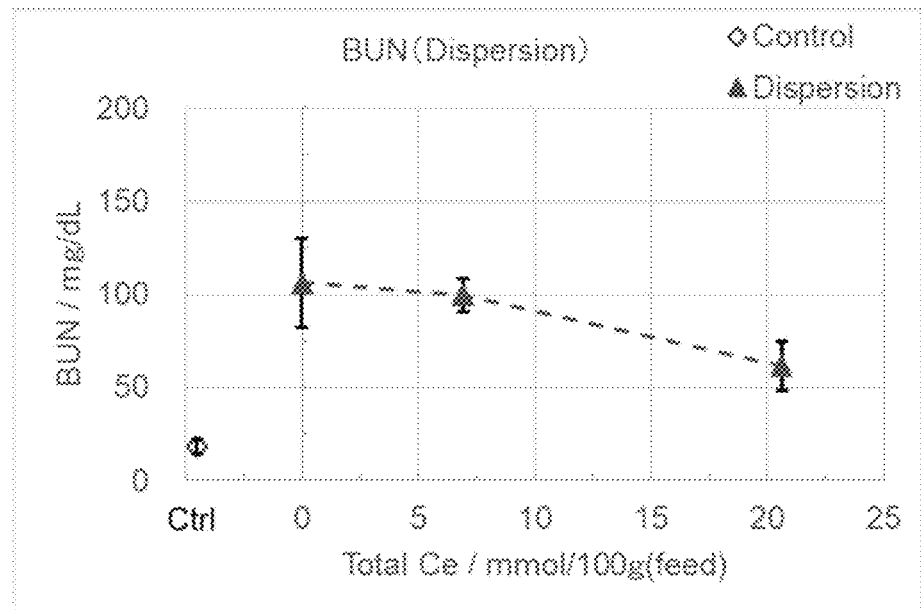
[Fig. 14]
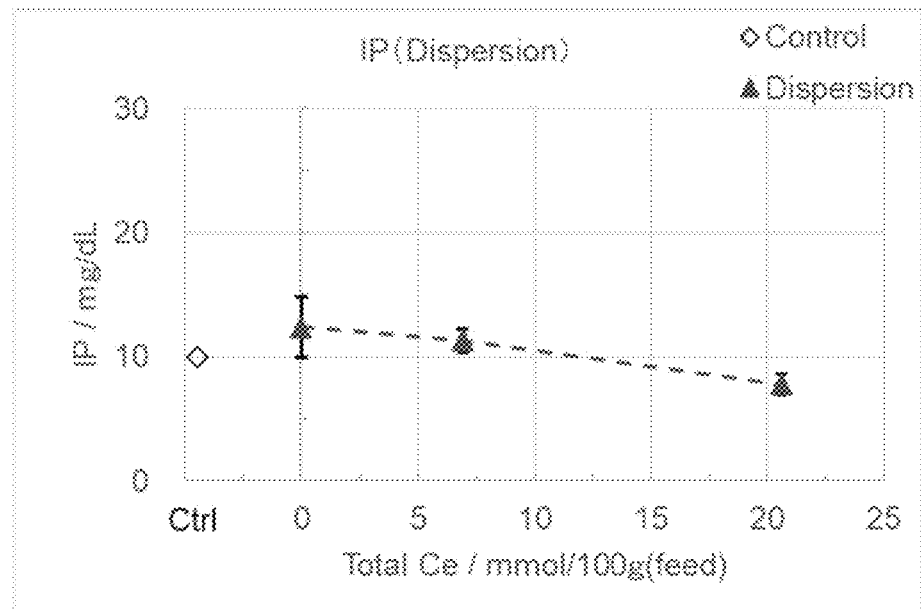

[Fig. 15]
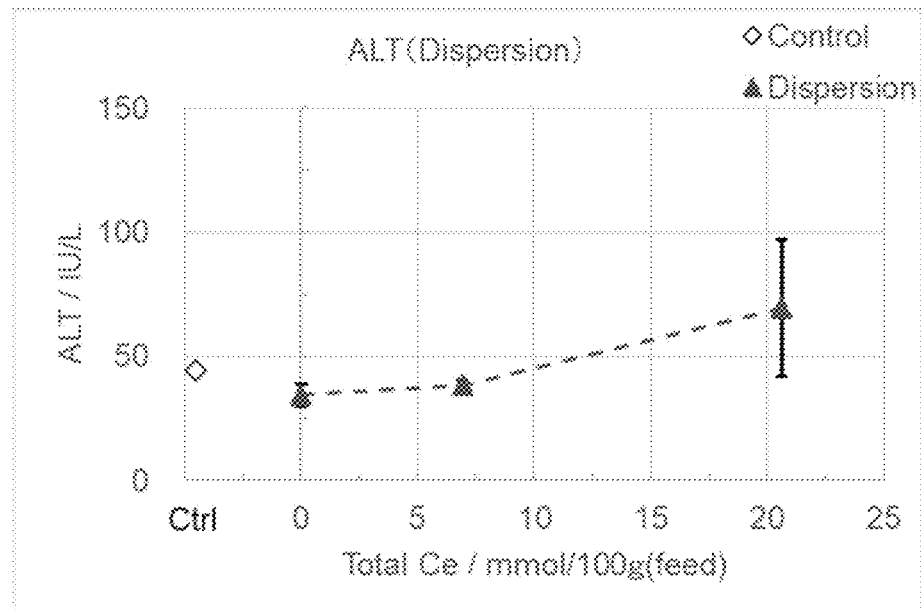
[Fig. 16]
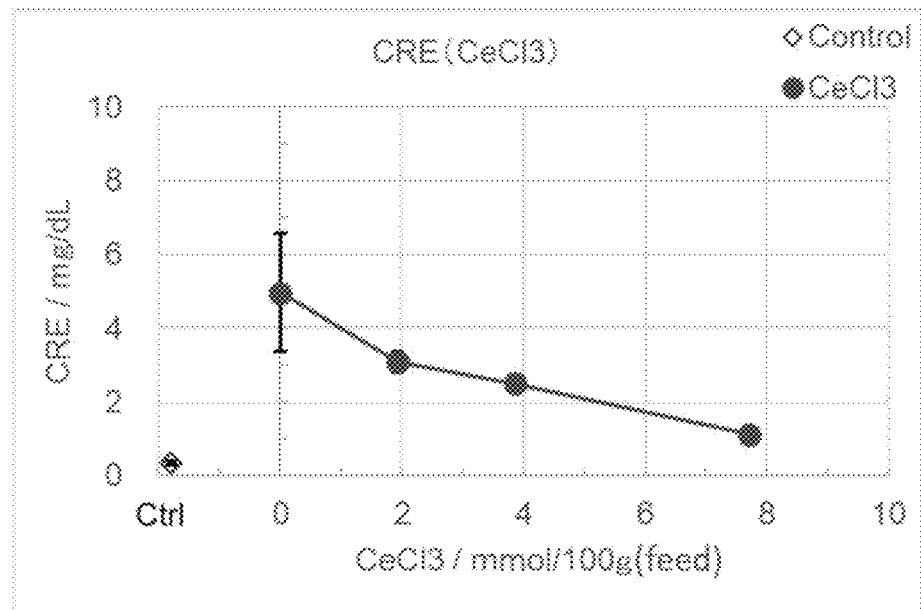

[Fig. 17]
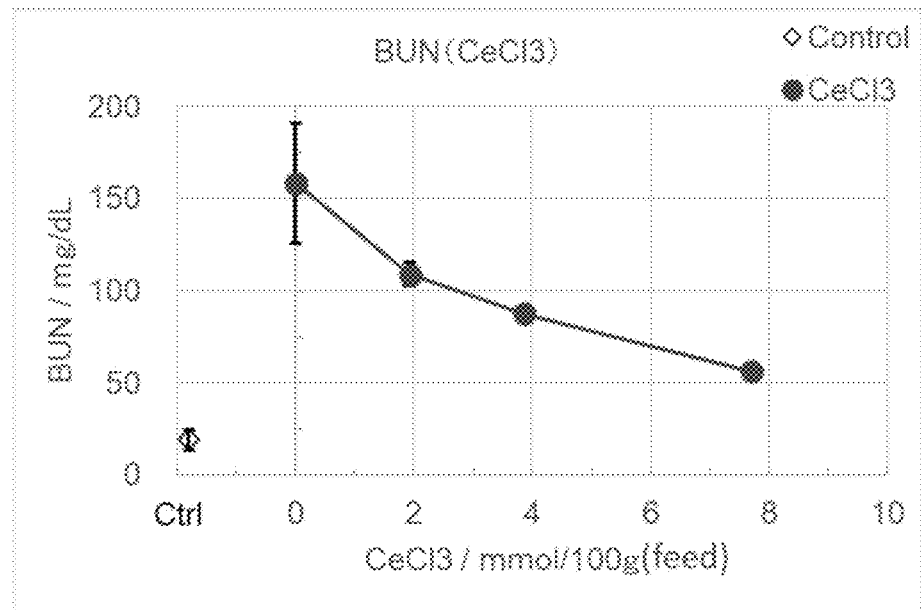
[Fig. 18]
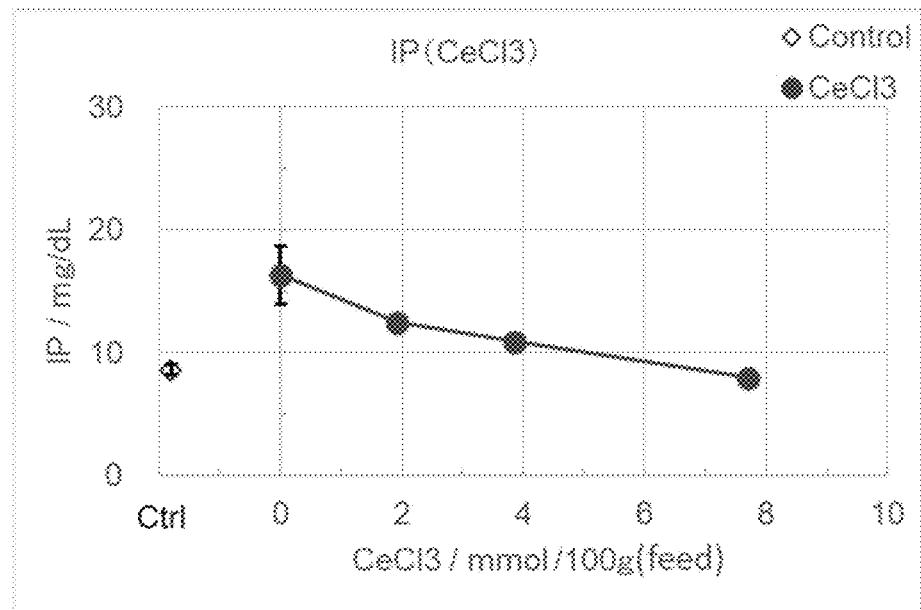

[Fig. 19]
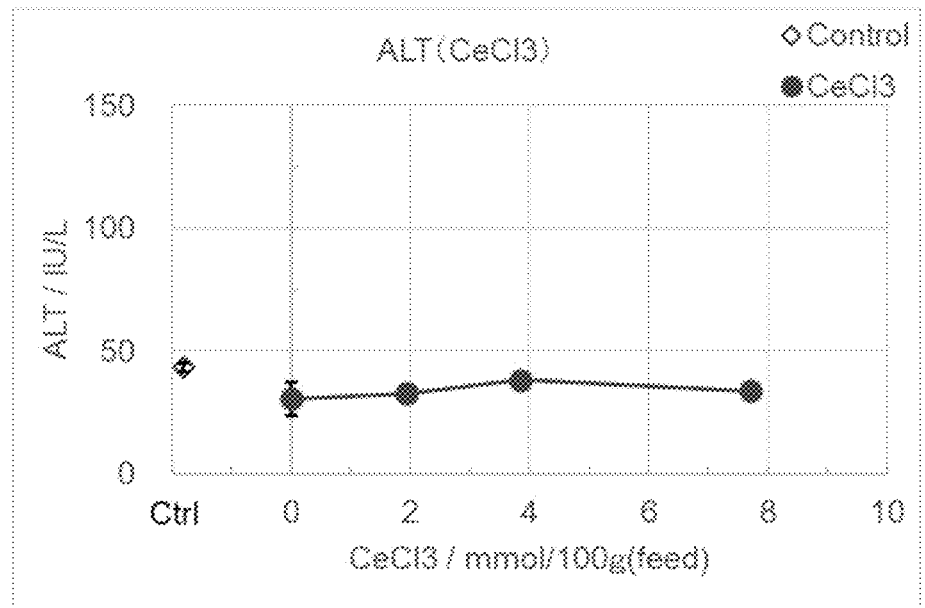
[Fig. 20]
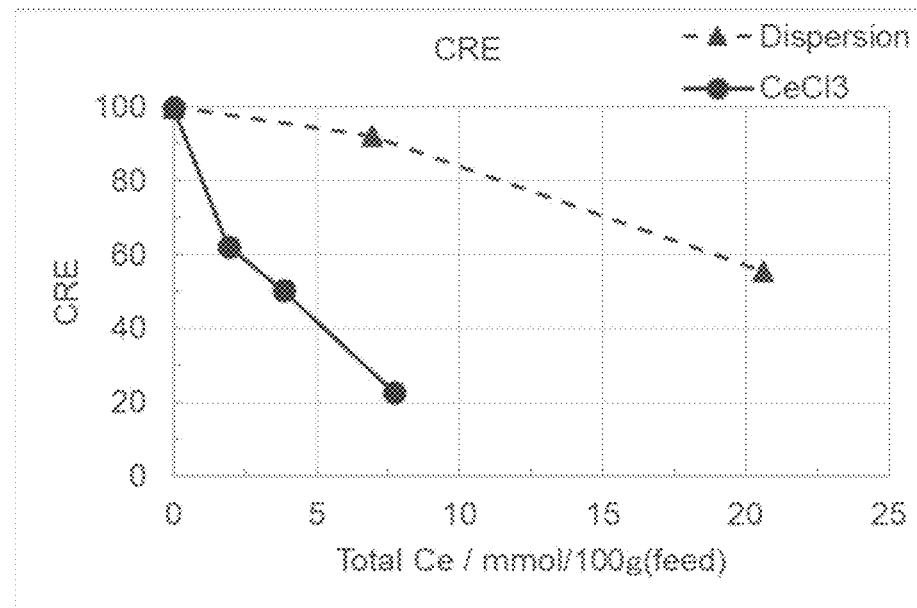

[Fig. 21]
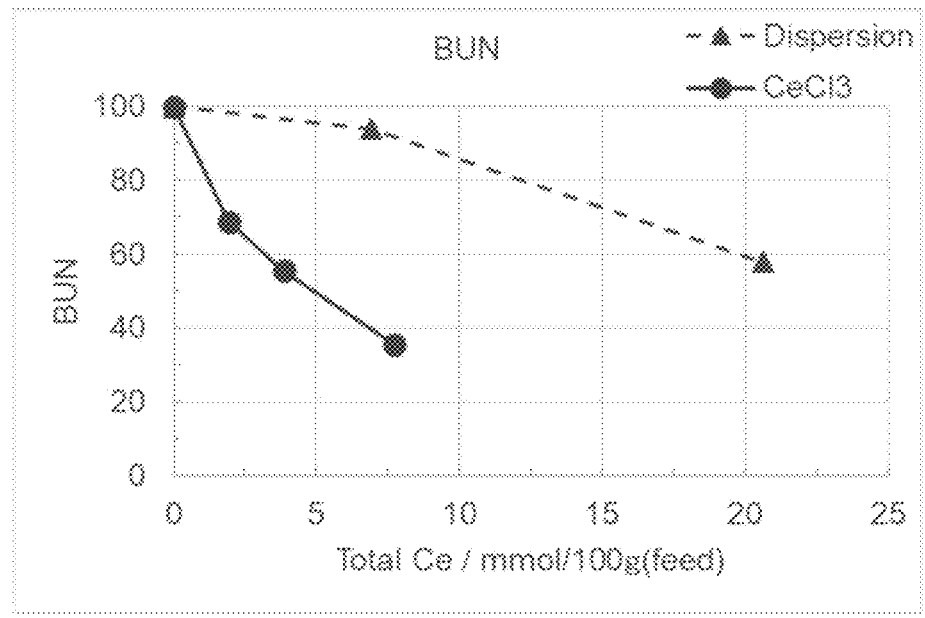
[Fig. 22]
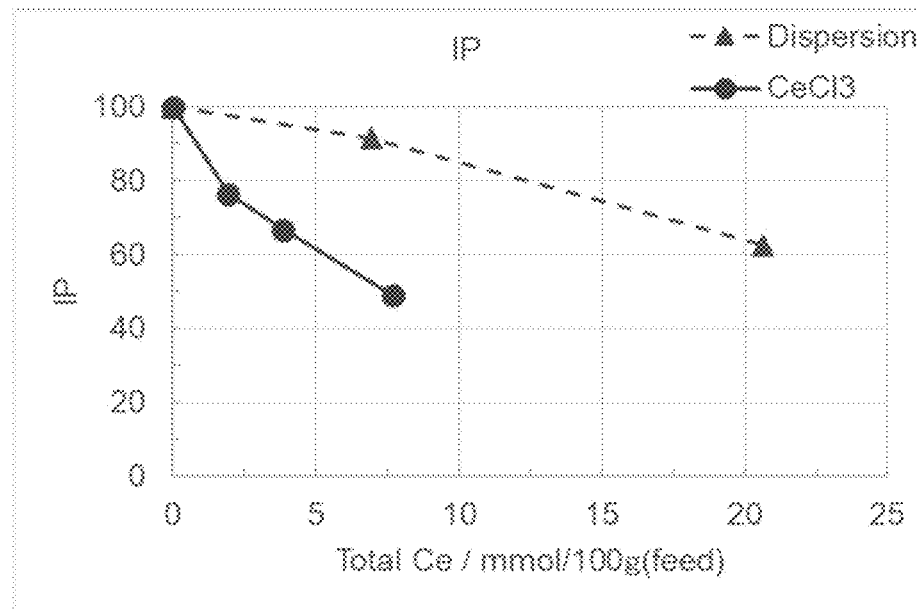

[Fig. 23]
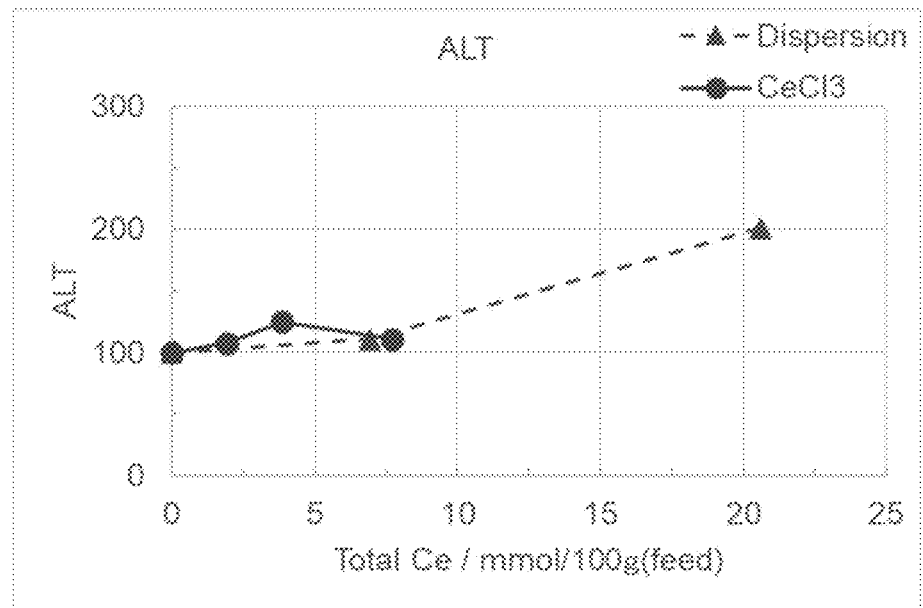
[Fig. 24]
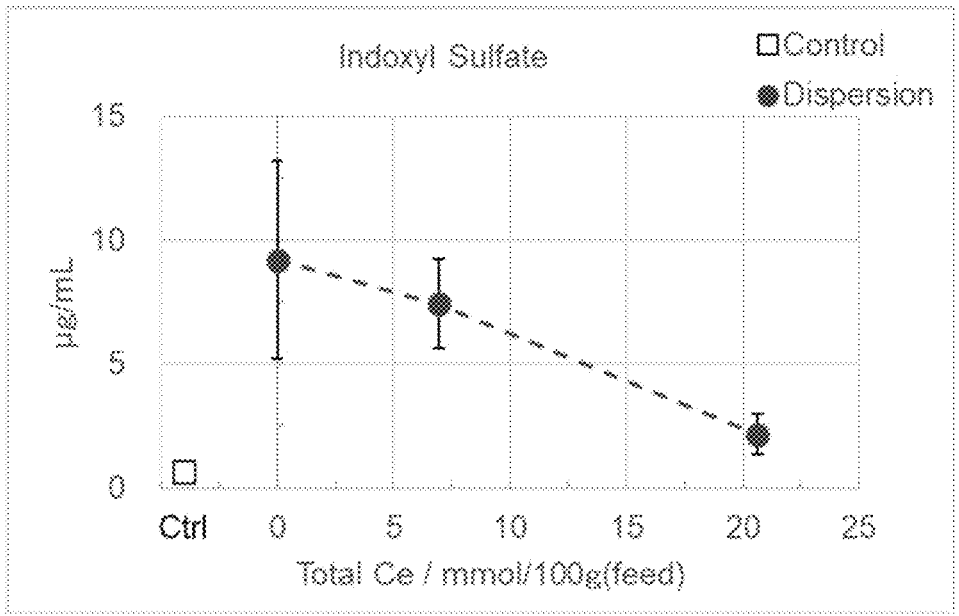

[Fig. 25]
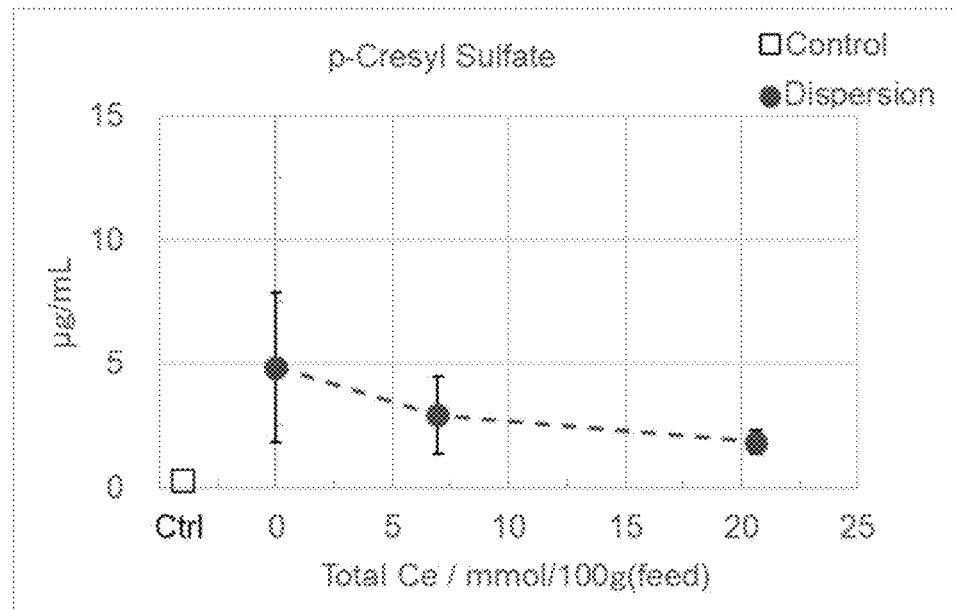
[Fig. 26]
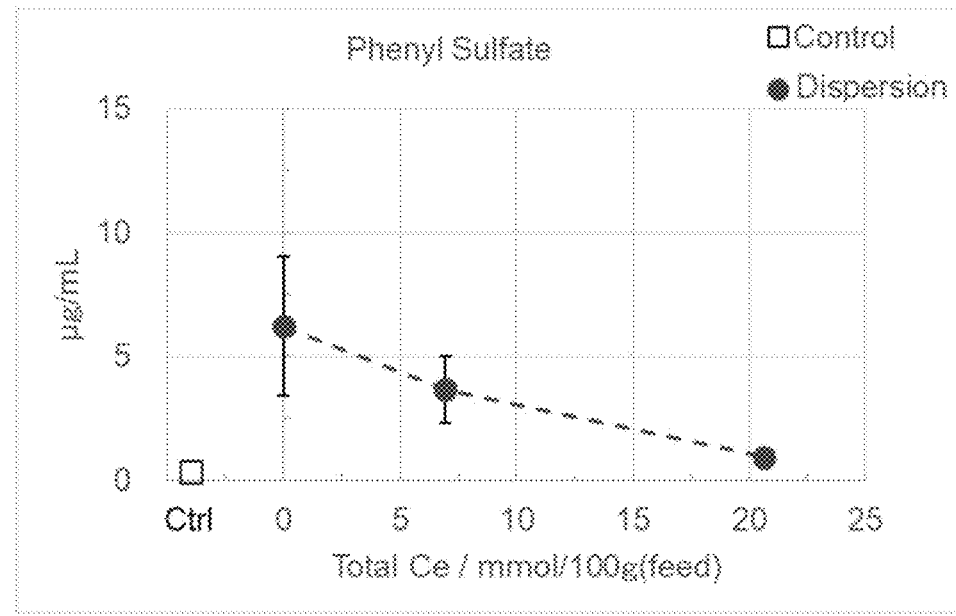

[Fig. 27]
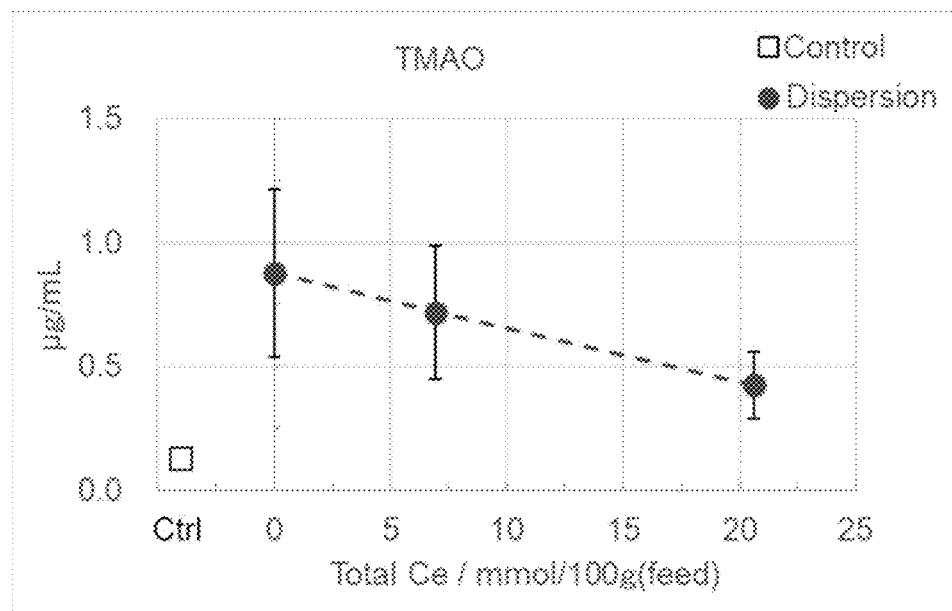

PHARMACEUTICAL COMPOSITION CONTAINING CERIUM COMPOUND AS ACTIVE INGREDIENT

TECHNICAL FIELD

The present invention relates to a pharmaceutical composition that contains a cerium compound as an active ingredient. The present invention also relates to a therapeutic agent for kidney disease, particularly to a therapeutic agent for kidney disease for lowering the level(s) or suppressing the level(s) from elevating of one or two or more items selected from serum creatinine (CRE), blood urea nitrogen (BUN), and serum phosphorus (IP). The present invention also relates to an adsorbent for phosphorus.

BACKGROUND ART

Treatment of kidney disease has been focused on delaying progression of the disease by compensating renal functions with use of medicine, or on preventing the onset of complication due to depressed renal function. A magic bullet against the kidney disease, if worsened to renal failure, has however not been found. Drug therapy and diet therapy have been employed for delaying progression of the kidney disease. The kidney disease, if progressed, will need dialysis therapy.

Chronic kidney disease would result in a condition called uremia, typically due to in vivo increase and accumulation of substances (uremic toxins) suspected of causing uremic symptom, which should intrinsically be excreted outside the body (Non Patent Literature 1).

Among the uremic toxins, representative ones such as indoxyl sulfate, p-cresyl sulfate, and trimethylamine-N-oxide (TMAO) are metabolites produced as a result of enterobacterial metabolism.

Tryptophan, tyrosine, choline, and L-carnitine for example, when ingested as ingredients in meal and reached the large intestine without being absorbed in the small intestine, will undergo enterobacterial metabolism, to be converted into uremic toxin precursors such as indole, p-cresol, phenol, and trimethylamine (TMA), respectively.

These uremic toxin precursors, after absorbed into the body, reach the liver via systemic circulation and metabolized in the liver, are converted into uremic toxins such as indoxyl sulfate, p-cresyl sulfate, phenyl sulfate, and TMAO, respectively.

Although these uremic toxins are excreted with urine from the body under normal renal function, are however understood to accelerate progression of renal failure, if accumulated in the blood under declined excretion.

Indoxyl sulfate and p-cresyl sulfate are uremic toxins whose toxicity has been widely studied. TMAO is a uremic toxin that has attracted attention as a substance involved in cardiovascular disease, has been understood to accelerate arteriosclerosis and thrombus formation, and also has been reported that the blood level thereof is relevant to onset of cardiovascular disease. Acceleration of renal dysfunction and renal fibrosis, and so forth, have also been reported.

In vivo accumulation of uremic toxins would pose risk factors for various renal failure-related symptoms including insomnia, headache, anorexia, paresthesia, hypertension, anemia, neurological disorder, cardiovascular diseases, osteoarticular diseases, and bone mineral metabolic disorders, infectious disease, and malignant tumor, and would also accelerate kidney dysfunction and chronic kidney disease. It is therefore critical to remove the uremic toxins, also in the non-dialysis dependent chronic kidney disease before phasing into dialysis therapy.

A known method having been employed for removing the uremic toxin relates to treatment that relies upon artificial dialysis or administration of carbonaceous adsorbent preparation.

The carbonaceous adsorbent preparation (for example, oral adsorbent AST-120) is an oral adsorbent which adsorbs uremic toxin or precursor thereof in the gastrointestinal tract, and excretes them together with feces, thereby suppressing in vivo absorption of the uremic toxin or the precursor thereof through the intestinal tract, relieving burden on the liver, improving uremic symptoms, and delaying phasing into dialysis therapy (see Patent Literature 1, for example).

The aforementioned carbonaceous adsorbent preparation is understood to typically adsorb tryptophan and indole to suppress them from being absorbed into the body, and this consequently reduces indoxyl sulfate and so forth, thereby assisting the renal function.

Further decline of the renal function lowers excretion of phosphorus out of the body, and increases the blood phosphorus level, thereby increasing onset of hyperphosphatemia.

Hyperphosphatemia once occurred successively induces, for example, hypocalcemia, hyperactivity of parathyroid gland, and arteriosclerosis due to deposition of calcium phosphate on the blood vessel wall, and seriously affects life prognosis and quality of life (QOL) of the patient. A phosphorus adsorbent is therefore occasionally combined with dietary restrictions.

The phosphorus adsorbent suppresses elevation of blood phosphorus level after intestinal absorption, through binding with meal-derived phosphorus in the gastrointestinal tract and being excreted.

Organic and inorganic oral phosphorus adsorbents have been used as therapeutic agents for hyperphosphatemia. Known organic oral phosphorus adsorbents include sevelamer hydrochloride preparation. Known inorganic oral phosphorus adsorbents include aluminum hydroxide preparation, calcium carbonate preparation, and ferric citrate preparation.

Sevelamer hydrochloride preparation has, however, been known to cause side effects such as constipation, abdominal pain, abdominal distension, and provocation of hyperchloremic metabolic acidosis, and this limits the dose. The aluminum hydroxide preparation has been known to induce brain disorders such as aluminum encephalopathy, and osteomalacia due to aluminum deposition, and is therefore prohibited in Japan. The calcium carbonate preparation, which is highly phosphorus-adsorptive and inexpensive, may however pose a problem such as calcification of soft tissues and blood vessels due to hypercalcemia. With respect to ferric citrate preparation, there have been concerns about elevating risks of various chronic diseases including diarrhea, constipation, elevation of serum ferritin, and iron accumulation in tissues.

Under such circumstances, a lanthanum carbonate hydrate preparation has increasingly been used in these years as a phosphorus adsorbent. Lanthanum carbonate reportedly excels in phosphorus adsorptivity, less likely to induce hypercalcemia, and is hardly absorbed into the body, and has been widespread as a phosphorus adsorbent with relatively small side effects.

Patent Literature 2 describes a pharmaceutical composition for treatment of hyperphosphatosis, which contains lanthanum carbonate and a diluent or carrier, mixed or associated therewith.

Reports have, however, been issued in succession in recent years, describing that deposition of lanthanum is observed in the gastrointestinal mucosa of patients who undergo hemodialysis due to chronic renal failure, and on medication of the lanthanum carbonate preparation (see Non Patent Literature 2, for example). Although whether the lanthanum deposition has pathological significance or not remains unclear at present, such lanthanum deposition would be a major concern for long-term medication of the lanthanum carbonate preparation.

Lanthanum carbonate has also been reported to pose a risk of accelerating in vivo absorption of lanthanum, by forming a complex with casein phosphopeptide in casein, and thus solubilizing lanthanum (Non Patent Literature 3).

Besides this, a highly swellable medicine and carbonates such as lanthanum carbonate may cause a feeling of distension due to generation of carbon dioxide gas upon dissolution.

CITATION LIST

Patent Literature

Patent Literature 1: JP S62-11611 B
Patent Literature 2: JP H11-503119 A

Non Patent Literature

Non Patent Literature 1: Toshimitsu Niwa and Takashi Miyazaki, Current State of Uremic Substance Research '98—from the 43rd Current Concept of the Japanese Society for Dialysis Therapy-, Journal of Japanese Society for Dialysis Therapy, [31], (12),
Non Patent Literature 2: Masaya Iwamuro, Hiromitsu Kanzaki, Seiji Kawano, Yoshiro Kawahara, Takehiro Tanaka, and Hiroyuki Okada, Endoscopic Features of Lanthanum Deposition in the Gastroduodenal Mucosa, Gastroenterol Endosc., [59], (6), 1428-1434 (2017)
Non Patent Literature 3: Munehiro Yoshida, Issei Nishizaki, Emi Komura, Ryota Hosomi, Kenji Fukunaga, Effect of difference in dietary protein on serum phosphorus and tissue lanthanum concentration in rats administered lanthanum carbonate, Trace Nutrients Research, [36], 29-34 (2019)

SUMMARY OF INVENTION

Technical Problem

As described above, there has been a demand for developing a therapeutic agent that can effectively suppress or prevent diseases, caused by increase of phosphorus or accumulation of uremic toxin in association with decreased renal function.

It is therefore a first object of the present invention to provide a novel pharmaceutical composition that contains a cerium compound as an active ingredient.

Furthermore, it is therefore a second object of the present invention to provide a therapeutic agent for kidney disease, particularly to provide a pharmaceutical composition for lowering the level(s), or for suppressing the level(s) from elevating, of one or two or more items selected from serum creatinine (CRE), blood urea nitrogen (BUN), and serum phosphorus (IP).

In addition, it is therefore a third object of the present invention to provide a phosphorus adsorbent having a phosphorus adsorptivity comparable to, or superior to that of the prior phosphorus adsorbent.

Solution to Problem

That is, the present invention aimed at solving the aforementioned problem relates to a pharmaceutical composition that includes a cerium compound as an active ingredient.

In a preferred mode of the present invention, the pharmaceutical composition is a therapeutic agent for kidney disease.

In a preferred mode of the present invention, the pharmaceutical composition is an adsorbent for phosphorus.

In a preferred mode of the present invention, the pharmaceutical composition is an adsorbent for uremic toxin precursor.

In a preferred mode of the present invention, the pharmaceutical composition is for use for reducing or suppressing elevation of serum creatinine (CRE) level.

In a preferred mode of the present invention, the pharmaceutical composition is for use for reducing or suppressing elevation of blood urea nitrogen (BUN) level.

In a preferred mode of the present invention, the cerium compound is coated with a dispersant.

By forming the cerium compound particles in the presence of the dispersant, coalescence among cerium compound nuclei, generated in the early stage of particle formation, may be suppressed. This successfully reduces the final particle size of the cerium compound, and enlarges the area of reaction interface where the pharmaceutical composition reacts with a substance to be acted on (also referred to as a target reactant) such as phosphorus (phosphoric acid) or a uremic toxin precursor. Also appropriate conditioning of the production enables highly efficient production.

Since the cerium compound particle is coated with the dispersant, the cerium compound is suppressed from reacting with a complex-forming component to form a complex, whereby the cerium compound or the cerium component thereof is suppressed from being absorbed in the gastrointestinal tract.

In addition, since the cerium compound particle is coated with the dispersant, the cerium compound will be highly re-dispersible into aqueous solution even after dried to solidify, making it applicable to any dosage form.

In a preferred mode of the present invention, the dispersant has a carboxy group and/or a carboxylate group.

The dispersant having a carboxy group and/or a carboxylate group excels in coatability over the cerium compound.

In a preferred mode of the present invention, the dispersant is one or two or more species selected from the group consisting of fatty acid, polycarboxylic acid, amino acid, and pharmaceutically acceptable salts or derivatives thereof.

In a preferred mode of the present invention, the fatty acid has 8 or less carbon atoms.

With use of such fatty acid having a relatively small number of carbon atoms, that is, with use of the fatty acid having a relatively small molecular weight as the dispersant, typically expectable is an effect of enlarging the area of reaction interface with a target reactant or other beneficial effects.

In a preferred mode of the present invention, the polycarboxylic acid is polyacrylic acid.

In a preferred mode of the present invention, the amino acid has 8 or less carbon atoms.

In a preferred mode of the present invention, the cerium compound is in the form of fine particle having an average primary particle size of 100 nm or smaller.

With the average primary particle size controlled to 100 nm or smaller, the cerium compound will have enhanced adsorption capacity for a target adsorbate, and enhanced action on other target reactants.

In a preferred mode of the present invention, the cerium compound is water-insoluble.

Use of the water-insoluble cerium compound can suppress gastrointestinal absorption of the cerium compound or the cerium component, and deposition thereof on the digestive tract mucosa.

In a preferred mode of the present invention, the cerium compound is one or two or more species selected from the group consisting of oxide, hydroxide, oxyhydroxide, oxalate, and fluoride of cerium.

In a preferred mode of the present invention, the pharmaceutical composition is an oral agent.

In a preferred mode of the present invention, the pharmaceutical composition is a hemodialysis composition.

The present invention aimed at solving the aforementioned problem also relates to a method for producing a fine particle of cerium oxide, including the following steps:

(Step A)
placing, in a reaction vessel, 0.2 mol/L or more of a cerium salt, a dispersant, and water, and stirring them while maintaining the temperature of solution at 5 to 35° C., to prepare a solution;

(Step B)
then, adding a necessary amount of hydrogen peroxide solution to the solution while keeping stirring;

(Step C)
then, adding 1 mol/L or more of a hydroxide ion source to the solution while keeping stirring;

(Step D)
heating the solution while keeping stirring, maintaining for a predetermined time, then cooling the solution down to room temperature; and (Step E)
then, adjusting the concentration of the solution to a predetermined level, to obtain an aqueous dispersion of cerium oxide.

The production method of the present invention can produce the fine particle of cerium oxide under a high concentration condition, which was previously producible only in a dilute solution, with a high yield of the fine particle of cerium oxide.

The present invention aimed at solving the aforementioned problem also relates to use of the cerium compound in the production of a therapeutic agent for kidney disease.

The preferred mode of the cerium compound and the preferred mode of use are as described above.

The present invention aimed at solving the aforementioned problem also relates to use of the cerium compound as an active ingredient for treatment of kidney disease.

The preferred mode of the cerium compound and the preferred mode of use are as described above.

The present invention aimed at solving the aforementioned problem also relates to a cerium compound for use for treatment of kidney disease.

The preferred mode of the cerium compound and the preferred mode of use are as described above.

The present invention aimed at solving the aforementioned problem also relates to a method for treating kidney disease, including administering the cerium compound to a subject in need of treatment of kidney disease.

The preferred mode of the cerium compound and the preferred mode of use are as described above.

The present invention also relates to a method for treating kidney disease, which includes administering the cerium compound to a subject in need of treatment of kidney disease.

In a preferred mode, the cerium compound is cerium oxide.

In another preferred mode, the cerium compound is cerium chloride.

In another preferred mode, the cerium compound contains trivalent cerium.

In another preferred mode, the cerium compound contains cerium oxide and cerium chloride.

The preferred mode of the method for treating kidney disease includes reducing, maintaining, or suppressing elevation, of serum creatinine (CRE) level of the subject.

The preferred mode of the method for treating kidney disease includes reducing, maintaining, or suppressing elevation, of blood urea nitrogen (BUN) level of the subject.

The preferred mode of the method for treating kidney disease includes reducing a uremic toxin or a precursor thereof in the body of the subject.

In a preferred mode, the treatment method includes reducing, maintaining, or suppressing elevation, of a uremic toxin in the blood of the subject.

In a preferred mode, the uremic toxin is one or two or more species selected from the group consisting of indoxyl sulfate, p-cresyl sulfate, phenyl sulfate, and trimethylamine-N-oxide (TMAO).

In another preferred mode, the treatment method includes adsorbing the uremic toxin precursor of the subject.

Advantageous Effects of Invention

According to the present invention, a novel pharmaceutical composition that contains a cerium compound is obtainable.

The cerium compound or a metal component thereof contained in the pharmaceutical composition in a mode of the present invention are suppressed from being absorbed through gastrointestinal tract or from depositing on the gastrointestinal tract, and is excellently suited as an oral agent.

In a preferred mode of the present invention, the pharmaceutical composition of the present invention can demonstrate phosphorus adsorptivity comparable to or superior to that of a conventional phosphorus adsorbent, proving its excellence as an oral agent.

In a preferred mode of the present invention, the pharmaceutical composition of the present invention can demonstrate adsorptivity to uremic toxin precursor, proving its excellence as an oral agent.

In a preferred mode of the pharmaceutical composition of the present invention, the pharmaceutical composition can also lower the level(s) of, or can suppress the level(s) from elevating of, serum creatinine (CRE), blood urea nitrogen (BUN) and/or serum phosphorus (IP).

BRIEF DESCRIPTION OF DRAWINGS

FIG. 1 is a transmission electron micrograph (TEM photograph) of a cerium compound (particles 1) according to the present invention.

FIG. 2 is a graph illustrating relations between the particle size of cerium oxide and detection rate of residual phosphoric acid at pH 1.0.

FIG. 3 is a graph illustrating relations between the particle size of cerium oxide and detection rate of residual phosphoric acid at pH 7.0.

FIG. 4 is a graph illustrating relationship between difference in phosphorus adsorptivity at pH 1.0 and pH 7.0, and the particle size of cerium oxide.

FIG. 5 is a graph illustrating comparison of phosphorus adsorptivity, between the cerium compound (particle 1) according to the present invention and a particle 7 of Comparative Example.

FIG. 6 is a graph illustrating comparison of phosphorus adsorptivity between a cerium compound (particle 1) according to the present invention and lanthanum carbonate of Comparative Example, at pH 2.5 and pH 7.0.

FIG. 7 is a graph illustrating adsorption ratio of uremic toxin precursors including indole, to cerium oxide according to the present invention.

FIG. 8 is a graph illustrating comparison of serum phosphorus (IP) levels between a case where the pharmaceutical composition of the present invention was added, and Comparative Examples (cerium oxide not added, or lanthanum carbonate added).

FIG. 9 is a graph illustrating comparison of serum creatinine (CRE) levels between a case where the pharmaceutical composition of the present invention was added, and Comparative Examples (cerium oxide not added, or lanthanum carbonate added).

FIG. 10 is a graph illustrating comparison of blood urea nitrogen (BUN) levels between a case where the pharmaceutical composition of the present invention was added, and Comparative Examples (cerium oxide not added, or lanthanum carbonate added).

FIG. 11 is a graph illustrating comparison of serum ALT (GPT) levels between a case where the pharmaceutical composition of the present invention was added, and Comparative Examples (cerium oxide not added, or lanthanum carbonate added).

FIG. 12 is a graph illustrating serum creatinine levels (CRE) in cases with a normal feed (control), an adenine feed (total cerium content=0 mmol/100 g feed), and an adenine+cerium oxide dispersion feed. The results teach that the CRE level declines depending on the total cerium content (mol) in 100 g of feed.

FIG. 13 is a graph illustrating blood urea nitrogen levels (BUN) in cases with the normal feed (control), the adenine feed (total cerium content=0 mmol/100 g feed), and the adenine+cerium oxide dispersion feed. The results teach that the BUN level declines depending on the total cerium content (mol) in 100 g of feed.

FIG. 14 is a graph illustrating blood phosphorus levels (IP) in cases with the normal feed (control), the adenine feed (total cerium content=0 mmol/100 g feed), and the adenine+cerium oxide dispersion feed. The results teach that the IP level declines depending on the total cerium content (mol) in 100 g of feed.

FIG. 15 is a graph illustrating alanine aminotransferase levels (ALT) in cases with the normal feed (control), the adenine feed (total cerium content=0 mmol/100 g feed), and the adenine+cerium oxide dispersion feed. The graph illustrates relation between the total cerium content (mol) in 100 g of feed, and ALT.

FIG. 16 is a graph illustrating serum creatinine levels (CRE) in cases with the normal feed (control), the adenine feed ($CeCl_3$=0 mmol/100 g feed), and the adenine+cerium chloride feed. The results teach that the CRE level declines depending on the cerium chloride content (mol) in 100 g of feed.

FIG. 17 is a graph illustrating blood urea nitrogen levels (BUN) in cases with the normal feed (control), the adenine feed ($CeCl_3$=0 mmol/100 g feed), and the adenine+cerium chloride feed. The results teach that the BUN level declines depending on the cerium chloride content (mol) in 100 g of feed.

FIG. 18 is a graph illustrating blood phosphorus levels (IP) in cases with the normal feed (control), the adenine feed ($CeCl_3$=0 mmol/100 g feed), and the adenine+cerium chloride feed. The results teach that the IP level declines depending on the cerium chloride content (mol) in 100 g of feed.

FIG. 19 is a graph illustrating alanine aminotransferase levels (ALT) in cases with the normal feed (control), the adenine feed ($CeCl_3$=0 mmol/100 g feed), and the adenine+cerium chloride feed. The graph illustrates relation between the cerium chloride content (mol) in 100 g of feed, and ALT.

FIG. 20 is a graph comparatively illustrating serum creatinine levels (CRE), with the average value thereof normalized at 100, of the adenine feed group, relative to the total molar amount of cerium in cerium oxide dispersion, and on the molar amount of cerium in $CeCl_3$.

FIG. 21 is a graph comparatively illustrating blood urea nitrogen levels (BUN), with the average value thereof normalized at 100, of the adenine feed group, relative to the total molar amount of cerium in cerium oxide dispersion, and on the molar amount of cerium in $CeCl_3$.

FIG. 22 is a graph comparatively illustrating blood phosphorus levels (IP), with the average value thereof normalized at 100, of the adenine feed group, relative to the total molar amount of cerium in cerium oxide dispersion, and on the molar amount of cerium in $CeCl_3$.

FIG. 23 is a graph comparatively illustrating the alanine aminotransferase levels (ALT), with the average value thereof normalized at 100, of the adenine feed group, relative to the total molar amount of cerium in cerium oxide dispersion and on the molar amount of cerium in $CeCl_3$.

FIG. 24 is a graph illustrating plasma indoxyl sulfate levels in cases with the normal feed (control), the adenine feed (total cerium content=0 mmol/100 g feed), and the adenine+cerium oxide dispersion feed. The results teach that the plasma indoxyl sulfate level declines depending on the total cerium content (mol) in 100 g of feed.

FIG. 25 is a graph illustrating plasma p-cresyl sulfate levels in cases with the normal feed (control), the adenine feed (total cerium content=0 mmol/100 g feed), and the adenine+cerium oxide dispersion feed. The results teach that the plasma p-cresyl sulfate level declines depending on the total cerium content (mol) in 100 g of feed.

FIG. 26 is a graph illustrating plasma phenyl sulfate levels in cases with the normal feed (control), the adenine feed (total cerium content=0 mmol/100 g feed), and the adenine+cerium oxide dispersion feed. The results teach that the plasma phenyl sulfate level declines depending on the total cerium content (mol) in 100 g of feed.

FIG. 27 is a graph illustrating plasma trimethylamine-N-oxide (TMAO) levels in cases with the normal feed (control), the adenine feed (total cerium content=0 mmol/100 g feed), and the adenine+cerium oxide dispersion feed. The results teach that the plasma trimethylamine-N-oxide (TMAO) level declines depending on the total cerium content (mol) in 100 g of feed.

DESCRIPTION OF EMBODIMENTS

Next, preferred embodiments of the present invention will be detailed. Note that the present invention is not limited to the following embodiments, and is freely modifiable within the scope of the present invention.

(1) Cerium Compound

The present invention relates to a pharmaceutical composition that contains a cerium compound as an active ingredient.

In a preferred mode of the present invention, the pharmaceutical composition of the present invention contains the cerium compound, as an active ingredient with adsorptivity to phosphorus. In a preferred mode of the present invention, the pharmaceutical composition of the present invention contains the cerium compound, as an active ingredient with adsorptivity to indole or other uremic toxin precursor.

The cerium compound may be either trivalent cerium compound, or tetravalent cerium compound, or even may be a mixed system of these compounds. The cerium compound is exemplified by cerium oxide, cerium hydroxide, cerium oxyhydroxide (oxide ($O_2^-$) and hydroxide ($OH^-$) coexist as anions), cerium carbonate, cerium oxalate, cerium acetate, cerium nitrate, cerium (IV) ammonium nitrate, cerium sulfate, cerium (IV) ammonium sulfate, cerium fluoride, and cerium chloride. These cerium compounds may be anhydrides or hydrates. These cerium compounds may have solid-solubilized therein a pharmaceutically acceptable metal other than cerium, whose molar ratio to cerium is smaller than 0.5.

Only one kind of these cerium compounds may be used singly, or two or more kinds may be used in a combined manner.

The cerium compound is preferably less water-soluble. Solubility of the cerium compound per 100 g of water at 20° C. (g/100 g $H_2O$) is preferably 0.1 or smaller, more preferably $1 \times 10^{-4}$ or smaller, even more preferably $1 \times 10^{-7}$ or smaller, particularly preferably $2 \times 10^{-9}$ or smaller, and most preferably $1 \times 10^{-9}$ or smaller. The cerium compound used herein is preferably water-insoluble. The less water-soluble, or water-insoluble cerium compound is exemplified by cerium oxide, cerium hydroxide, and cerium oxyhydroxide. Among them, cerium oxide is particularly preferred. These cerium compounds may be anhydrides or hydrates.

Note that, in the present invention, the less water-soluble and water-insoluble cerium compounds will be collectively referred to as water-insoluble cerium compound.

With use of the less water-soluble or water-insoluble cerium compound as the cerium compound, such cerium compound or a cerium component derived from the cerium compound may be suppressed from being absorbed through the intestinal tract, or from depositing on the gastrointestinal mucosa.

The cerium compound is preferably in the form of particle, and more preferably in the form of fine particle. Average primary particle size of the fine particle of the cerium compound is preferably 100 nm or smaller, more preferably 50 nm or smaller, even more preferably 30 nm or smaller, particularly preferably 20 nm or smaller, and most preferably 10 nm or smaller. With such small particle size, the cerium compound will have large total surface area, that is, the area of reaction interface where the particle can act on the target reactant such as adsorbate, making it possible to obtain the pharmaceutical composition with further excellent adsorptivity and/or operation.

Here, the average primary particle size may be determined by photographing the particles under an electron microscope, measuring the diameter of randomly selected 10 or more particles on a captured image, and averaging the measured values. Scattering spectral analysis based on dynamic light scattering may alternatively be applicable, in which case, correction by observation under an electron microscope is necessary.

The fine particle is very likely to aggregate, and will become very difficult to re-disperse once aggregated. This tendency becomes more prominent as the particle size reduces. The cerium compound used in the present invention is therefore preferably dispersed in an aqueous solution. The cerium compound preferably stays dispersed in the aqueous solution after being formed in the aqueous solution; more preferably stays dispersed in the aqueous solution, without undergoing a dry state throughout the formulation process; and most preferably stays dispersed in the aqueous solution just up to the time of use.

By keeping dispersed in the aqueous solution, the cerium compound, even with a small particle size, may be prevented from aggregating.

The crystalline phase of the cerium compound is not particularly limited. For the cerium compound when given as cerium oxide, the crystal surface is preferably composed mainly of at least one of {100} plane, {111} plane, or {110} plane; more preferably composed of at least either {100} plane or {111} plane; and most preferably composed of {100} plane.

The content of the cerium compound relative to the total amount of the pharmaceutical composition of the present invention is preferably, but not particularly limited to, 0.001 to 99.9% by mass, and more preferably 0.01 to 98.5% by mass.

In one embodiment of the pharmaceutical composition of the present invention, the cerium compound, which is an active ingredient, is a cerium compound that contains trivalent cerium. The cerium compound that contains trivalent cerium may be a salt or complex thereof that contains trivalent cerium, or hydrate thereof.

Here, the pharmaceutical composition of the present invention may be not only in a mode that the cerium compound per se functions as an active ingredient, but also in a mode that trivalent cerium ion released from the cerium compound functions as the active ingredient.

The cerium compound that contains trivalent cerium is exemplified by cerium(III) nitrate, cerium(III) chloride, cerium(III) bromide, cerium(III) iodide, cerium(III) perchlorate, cerium(III) iodate, cerium(III) sulfate, cerium(III) carbonate, cerium(III) phosphate, cerium(III) ammonium nitrate, cerium(III) formate, cerium(III) acetate, cerium(III) propionate, cerium(III) butyrate, cerium(III) pentanoate, cerium(III) hexanoate, cerium(III) octanoate, cerium(III) oleate, cerium(III) lactate, cerium(III) citrate, cerium(III) oxalate, cerium(III) phosphate, cerium(III)-EDTA, and hydrates of these compounds.

Only one kind of these cerium compounds may be used singly, or two or more kinds may be used in a combined manner. The cerium compound suitably used in the present invention may be one or more selected from cerium(III) chloride, cerium(III) nitrate, cerium(III) acetate, and hydrates of these compounds. More specifically, the cerium compounds, with the hydration numbers rounded off to the first decimal place, are suitably exemplified by cerium(III) chloride anhydride or hydrates thereof (monohydrate, dihydrate, trihydrate, tetrahydrate, pentahydrate, hexahydrate, heptahydrate, octahydrate, nonahydrate, and decahydrate); cerium(III) nitrate anhydride or hydrates thereof (dihydrate, trihydrate, tetrahydrate, pentahydrate, hexahydrate, heptahydrate, octahydrate, nonahydrate, decahydrate, and dodecahydrate); and cerium(III) acetate anhydride or hydrates thereof (monohydrate, dihydrate, trihydrate, tetrahydrate, pentahydrate, and hexahydrate). In the present invention, cerium(III) chloride hexahydrate, heptahydrate or octahydrate is preferably used, from which cerium(III) chloride heptahydrate is further preferably used.

The content of the cerium compound that contains trivalent cerium, relative to the total amount of the pharmaceutical composition of the present invention, is preferably 0.001 to 100% by mass, more preferably 0.003 to 99% by mass, and even more preferably 0.01 to 98% by mass.

(2) Dispersant

The cerium compound contained in the pharmaceutical composition of the present invention is preferably coated with a dispersant. By forming the cerium compound particles in the presence of the dispersant, coalescence among cerium compound nuclei, generated in the early stage of particle formation, may be suppressed. This successfully reduces the final particle size of the cerium compound, and enlarges the area of reaction interface, which is the surface of the particle that reacts with the target reactant such as adsorbate. Also appropriate conditioning of the production enables highly efficient production. In addition, since the cerium compound particles are coated with the dispersant, the cerium compound will be highly re-dispersible into aqueous solution even after dried up to solidify, making it applicable to any dosage form.

Small intestine and large intestine have been known to absorb compounds whose molecular weight is approximately 600 or smaller, and 300 or smaller, respectively. Coating of the cerium compound with the dispersant possibly creates an effect of substantially increasing the molecular weight of the cerium compound, and suppressing the intestinal absorption.

Coating of the cerium compound with the dispersant can also inhibit a complex-forming reaction between the cerium compound and a complex-forming component such as casein phosphopeptide, and can suppress the intestinal absorption of the cerium compound or the cerium component thereof.

The dispersant preferably has at least either carboxy group or carboxylate group as a functional group. That is, the dispersant is preferably carboxylic acid, pharmaceutically acceptable salt thereof, or derivative thereof. The dispersant having at least either carboxy group or carboxylate group as a functional group excels in coatability over the cerium compound, particularly on cerium oxide.

The dispersant is exemplified by hydroxy acid, fatty acid, aromatic carboxylic acid, polycarboxylic acid, oxocarboxylic acid, amino acid, and pharmaceutically acceptable salts or derivatives thereof; among them preferred are one or two or more kinds selected from the group consisting of fatty acid, polycarboxylic acid, amino acid, and pharmaceutically acceptable salts or derivatives thereof.

Preferred dispersants will be detailed below.

(i) Fatty Acid

The fatty acid used as the dispersant in the present invention may be either saturated fatty acid or unsaturated fatty acid, among which saturated fatty acid is preferred. The fatty acid used as the dispersant in the present invention may be any of straight-chain fatty acid, branched fatty acid, or cyclic fatty acid, among which straight-chain fatty acid is preferred.

The number of carbon atoms of the fatty acid is preferably smaller than 10, more preferably 8 or smaller, and even more preferably 6 or smaller. The number of carbon atoms of the fatty acid is preferably 2 or larger. The fatty acid with a small number of carbon atoms has low molecular weight, and is suitably hydrophilic or hydrophobic. Use of the fatty acid having a small number of carbon atoms as a dispersant under appropriate production conditions can suppress strong adhesion between nuclei, such as coalescence among nuclei generated during production of the cerium compound particle, and can instead form flocculation based on relatively weak interaction. This enables highly productive production of the cerium particle while keeping sufficient area of reaction interface, which is the surface of the particle that interacts with the target reactant such as adsorbate.

The fatty acid is preferably one or two or more compounds selected from the group consisting of saturated fatty acids such as ethanoic acid (acetic acid), propanoic acid (propionic acid), butanoic acid (butyric acid), pentanoic acid (valeric acid), hexanoic acid (caproic acid), octanoic acid (caprylic acid), and pharmaceutically acceptable salts or derivatives of these compounds. The pharmaceutically acceptable salt of the fatty acid and the derivatives thereof are preferably alkali metal salt such as sodium salt and potassium salt, or ammonium salt. The fatty acid salt is exemplified by sodium acetate, sodium propionate, sodium butyrate, and sodium octanoate.

(ii) Polycarboxylic Acid

The polycarboxylic acid used as the dispersant in the present invention is preferably polyacrylic acid. The pharmaceutically acceptable salt of the polycarboxylic acid and the derivatives thereof are preferably alkali metal salt such as sodium salt and potassium salt, or ammonium salt.

The polycarboxylic acid, when used as the dispersant, preferably has a molecular weight of 10,000 or smaller, more preferably 8,000 or smaller, even more preferably 5,000 or smaller, particularly preferably 3,000 or smaller, and most preferably 1,500 or smaller.

The polycarboxylic acid with a small molecular weight is suitably hydrophilic or hydrophobic. Use of the polycarboxylic acid having a small molecular weight as a dispersant under appropriate production conditions can suppress strong adhesion between nuclei, such as coalescence among nuclei generated during production of the cerium compound particle, and can instead form flocculation based on relatively weak interaction. This enables highly productive production of the cerium particle while keeping a sufficient area of reaction interface, which is the surface of the particle that interacts with the target reactant such as adsorbate.

(iii) Amino Acid

The amino acid, and pharmaceutically salts and derivatives thereof (hereinafter simply referred to as amino acid, unless otherwise specifically noted), used as the dispersant in the present invention, preferably has a number of carbon atoms of smaller than 10. The number of carbon atoms of the amino acid is more preferably 8 or smaller, and even more preferably 6 or smaller. The number of carbon atoms of the amino acid is preferably 2 or larger.

The amino acid with a small number of carbon atoms has low molecular weight, and is suitably hydrophilic or hydrophobic. Use of such amino acid having a small number of carbon atoms as a dispersant under appropriate production conditions can suppress strong adhesion between nuclei, such as coalescence among nuclei generated during production of the cerium compound particle, and can instead form flocculation based on a relatively weak interaction. This enables highly productive production of the cerium particle while keeping a sufficient area of reaction interface, which is the surface of the particle that interacts with the target reactant such as adsorbate.

The amino acid is preferably one or more kinds selected from glycine, γ-aminobutyric acid, and 6-aminohexanoic acid.

The amino acid is also preferably one or two or more selected from lysine, histidine, proline, threonine, isoleucine, alanine, leucine, glycine, valine, methionine, serine, tyrosine, glutamine, asparagine, cysteine, 3-aminopropanoic acid, γ-aminobutyric acid, 5-aminopentanoic acid, and 6-aminohexanoic acid.

The content ratio of the dispersant component to the cerium compound is preferably 1:0.001 to 1:1.2, and more preferably 1:0.003 to 1:0.3.

In another preferred mode, the content ratio of the dispersant component to the cerium compound is preferably 1:0.001 to 1:10, and more preferably 1:0.003 to 1:3.

When two or more kinds of the dispersant are used, the ratio of the total content of the dispersants to the cerium compound preferably falls within any of the aforementioned ranges.

The content of the dispersant component relative to the total amount of the pharmaceutical composition of the present invention is preferably, but not particularly limited to, 0.01 to 4% by mass, and more preferably 0.05 to 2% by mass.

In another preferred mode, the content of the dispersant component relative to the total amount of the pharmaceutical composition of the present invention is preferably, but not particularly limited to, 0.01 to 20% by mass, and more preferably 0.05 to 10% by mass.

(3) Method for Producing Cerium Compound

The description below will explain a method for producing the fine particle of cerium oxide, as a mode of the cerium compound contained in the pharmaceutical composition of the present invention.

<Procedure 1>
(Step A)
First, a dispersant, a cerium salt, other optional metal salt, and water are placed in a reaction vessel equipped with a stirrer, and the solution is then kept stirred at a predetermined temperature.

(Step B)
The solution is then kept stirred, to which a predetermined amount of hydrogen peroxide solution is added.

(Step C)
The solution is then kept stirred, to which a predetermined amount of a hydroxide ion source is added.

(Step D)
The solution is then heated to a predetermined temperature while being kept stirred, maintained for a predetermined time, and cooled down approximately to room temperature.

(Step E)
The concentration of the solution is then adjusted to a predetermined level, to obtain an aqueous dispersion of cerium oxide (aqueous dispersion of cerium compound).

In another preferred mode, the method for producing the fine particle of cerium oxide includes the following steps A to E.

<Procedure 2>
(Step A)
First, a dispersant, a cerium salt, and water are placed in a reaction vessel equipped with a stirrer, and they are stirred while maintaining the temperature of solution at a predetermined temperature, to prepare a solution.

(Step B)
The solution is then kept stirred, to which a necessary amount of hydrogen peroxide solution is added.

(Step C)
The solution is then kept stirred, to which a hydroxide ion source is added.

(Step D)
heating the solution while kept stirred, maintaining for a predetermined time, then cooling the solution down to room temperature; and (Step E)
The solution is then filtered and a necessary amount water is added to the filtered matter to obtain a dispersion or a paste of the fine particle of cerium oxide. Alternatively, the filtered matter may be allowed to dry naturally.

The concentration of the cerium salt in step A is preferably set high, from the viewpoint of productivity. The concentration of the cerium salt is preferably 0.2 mol/L or higher. The concentration of the cerium salt is preferably 0.2 to 4.0 mol/L, more preferably 0.4 to 3.5 mol/L, even more preferably 0.5 to 3.0 mol/L, and particularly preferably 0.6 to 2.5 mol/L.

The metal other than cerium to be solid-solubilized in the cerium compound is not specifically limited so long as it is pharmaceutically acceptable, and the molar ratio to cerium is smaller than 0.5.

The dispersant in step A must be dissolved in advance to coexist with the cerium salt. The concentration of the dispersant may be appropriately determined, depending on the concentration of the cerium salt, so as to fall within the aforementioned preferred range of the content ratio relative to the cerium salt. The content of the dispersant relative to the mass of the cerium salt is preferably 0.01 to 30% by mass, more preferably 0.1 to 20% by mass, and even more preferably 0.1 to 10% by mass. The concentration of the dispersant in the reaction solution is preferably 0.1 to 20 g/L, and more preferably 0.5 to 15 g/L.

The temperature of the solution in step A is 5 to 35° C., preferably 5 to 30° C., more preferably 5 to 25° C., and even more preferably 5 to 20° C. The temperature of the solution kept low as possible may reduce the particle size of the cerium oxide particle, with only a small variation.

The hydrogen peroxide solution in step B acts to promote formation of the fine particle. The amount of addition of the hydrogen peroxide solution is typically 0 to 4.0 mol/L, although suitably adjustable depending on the concentration of the cerium salt.

The hydroxide ion source in step C is preferably one kind, or two or more kinds selected from the group consisting of ammonia water, sodium hydroxide, and hexamethylenetetramine. The hydroxide ion source is more preferably one kind, or two or more kinds selected from ammonia water and sodium hydroxide.

The concentration of the hydroxide ion source in the reaction vessel in step C may be 1 mol/L or higher, although suitably adjustable depending on the concentration of the cerium salt. The concentration of the hydroxide ion source is preferably 1 to 10 mol/L, more preferably 2 to 8 mol/L, and even more preferably 3 to 5 mol/L.

In another preferred mode, the concentration of the hydroxide ion source is preferably 1 to 25 mol/L, more preferably 2 to 20 mol/L, and even more preferably 3 to 16 mol/L.

The concentration of the hydroxide ion source may be 1 to 5 times the molar concentration of the cerium salt, preferably 1 to 4 times, more preferably 1.2 to 3.6 times, even more preferably 1.4 to 3.4 times, particularly preferably 1.6 to 3.2 times, and most preferably 1.8 to 3.0 times.

The holding temperature after the temperature elevation in step D is preferably 40 to 200° C., more preferably 40 to 150° C., even more preferably 40 to 120° C., particularly preferably 45 to 95° C., and most preferably 50 to 65° C.

In another preferred mode, the holding temperature after the temperature elevation in step D is preferably 25 to 200°

C., more preferably 30 to 150° C., even more preferably 35 to 120° C., particularly preferably 40 to 95° C., and most preferably 45 to 65° C.

The holding time after the temperature elevation in step D is typically 0 to 300 minutes, although suitably adjustable depending on the holding temperature, which is more preferably 5 to 240 minutes, even more preferably 10 to 180 minutes, yet more preferably 20 to 150 minutes, furthermore preferably 30 to 150 minutes, and most preferably 40 to 150 minutes.

The concentration of the cerium salt before condensation of the solution is 0.2 mol/L or higher, from the viewpoint of productivity. The concentration is preferably 0.2 to 4.0 mol/L, more preferably 0.3 to 3.5 mol/L, even more preferably 0.4 to 3.0 mol/L, and most preferably 0.5 to 2.5 mol/L.

In step E, the fine particle of cerium oxide may be condensed by any of known methods to obtain an aqueous dispersion of cerium oxide (aqueous dispersion of cerium compound) having a concentration of free choice, as described in procedure 1.

In addition, desalination, water addition for adjusting the concentration of the aqueous dispersion of cerium oxide, or acid or alkali addition for adjusting pH may be suitably performed.

The fine particle of cerium oxide, with the water content adjusted, may alternatively be formed into a dried product, besides the aqueous dispersion or a paste-like product.

The condensation in step E may rely upon filtering the aqueous dispersion of cerium compound by any of known methods (procedure 2).

The method of filtration applicable herein may be any of known methods, and is suitably selectable from natural filtration, reduced pressure filtration, pressure filtration, centrifugal filtration, ultrafiltration, and diafiltration.

In step E of procedure 1, the aqueous dispersion of cerium oxide is preferably condensed so as to adjust the final concentration of the cerium salt preferably to 0.3 to 40 mol/L, more preferably to 0.5 to 35 mol/L, even more preferably to 1 to 30 mol/L, and particularly preferably to 2 to 25 mol/L.

The individual components may be mixed by any of known methods, for example, with use of a mixer such as homogenizer.

The filtered or dried product of the fine particle of cerium oxide, or the aqueous dispersion of cerium oxide (aqueous dispersion of cerium compound) obtained in step E may be used in its intact form as the pharmaceutical composition of the present invention, or after being formulated by the method described later.

The fine particle of cerium oxide usually needs to be prepared in a dilute solution in order to suppress particle aggregation, and thus suffers from low yield and productivity. In contrast, the production method of the present invention can prepare the fine particle of cerium oxide at high concentration, and can produce the fine particle of cerium oxide in high yield.

Note that oxide-based particles often contain oxygen deficiency, hydrates, hydroxides or the like, and would usually have indefinite composition in the strict sense. The pharmaceutical composition of the present invention, when defined to contain the fine particle of cerium oxide as the active ingredient, may therefore only contain cerium oxide as a composition of the fine particle, allowing any indefinite composition in which other cerium compound such as cerium hydroxide is mixed.

(4) Dosage Form of Pharmaceutical Composition

The pharmaceutical composition of the present invention is preferably an oral agent.

The pharmaceutical composition of the present invention may adopt any of a variety of dosage forms, including solid preparations such as tablet, powder, granule, chewable tablet, and capsule; and liquid preparations such as fluid medicine, and syrup.

Other adoptable dosage forms include solid preparations such as tablets exemplified by OD (orally disintegrating) tablet, chewable tablets, foamed tablet, rapid release tablet, and sugar-coated tablet, capsules such as hard capsule and soft capsule, pill and troche; semi-solid preparations such as jelly and whipped preparation; and liquid preparations such as suspension, and emulsion.

In particular, the pharmaceutical composition that contains the aforementioned cerium compound coated with the dispersant has high re-dispersibility, while keeping a sufficient area of reaction interface of cerium compound due to the presence of the dispersant, and has versatility.

In particular, the pharmaceutical composition of the present invention can suitably employ the semi-solid or liquid preparation such as jelly agent, whipped preparation, syrup, suspension, or emulsion.

That is, the pharmaceutical composition of the present invention preferably has a dosage form having a water-containing base.

The water content relative to the total amount of the pharmaceutical composition of the present invention is preferably 1% by mass or more, more preferably 5% by mass or more, and even more preferably 10% by mass or more.

With the water content adjusted within any of the aforementioned ranges, the pharmaceutical composition of the present invention is easy to swallow even if orally ingested without water.

The water content relative to the total amount of the pharmaceutical composition of the present invention is preferably 99% by mass or less, more preferably 95% by mass or less, and even more preferably 90% by mass or less.

The base may contain thickener, gelling agent, oil and fat, sugar and so forth, besides water.

In a case where the aforementioned semisolid or liquid preparation is employed, the content of the cerium compound relative to the total amount of the pharmaceutical composition of the present invention is preferably 0.001 to 95% by mass, more preferably 0.01 to 90% by mass, and even more preferably 0.02 to 85% by mass.

The pharmaceutical composition of the present invention, to which the aforementioned semisolid or liquid form is applied, preferably has physical property including viscosity, fracture stress, or fracture strain, within the ranges below.

The viscosity of the pharmaceutical composition of the present invention is preferably 100 Pa·s or smaller, more preferably 10 Pa·s or smaller, and even more preferably 1 Pa·s or smaller.

In the present invention, the viscosity is defined by the value measured at 25° C., which is measurable typically with use of a rotary B-type viscometer (LVDV-E from AMETEK Brookfield, for example). All viscosities defined hereinafter in the present specification are measurable in the same manner as described above.

The fracture stress of the pharmaceutical composition of the present invention is preferably $1 \times 10^6$ Pa or smaller, more preferably $5 \times 10^5$ Pa or smaller, and even more preferably $2 \times 10^5$ Pa or smaller.

The fracture strain of the pharmaceutical composition of the present invention is preferably 95% or smaller, more preferably 90% or smaller, and even more preferably 85% or smaller.

In the present invention, the fracture stress and the fracture strain are measurable with use of a creep meter (for example, RE2-3305C from Yamaden Co., Ltd.) at a measurement temperature of 25° C.

With the physical properties controlled within the aforementioned ranges, the pharmaceutical composition will be easier to ingest for the user, particularly for elderly person with lowered swallowing ability.

The semisolid preparation or the liquid preparation is easier to ingest than the solid preparation, particularly allowed for dry-swallowing, thus largely contributing to maintain or improve the medication adherence.

Moreover, with use of a comprehensive wet process from the formation of the cerium compound particle as an active ingredient up to the formulation, from which process a dry state where the particle would aggregate is totally eliminated, the formulation process will be freed from a risk of aggregation of the cerium compound particle, and thus makes the area of reaction interface, which is the surface of the particle, sufficiently large. This successfully makes the cerium compound fully demonstrate its adsorptivity to phosphorus and the uremic toxin precursor, and action on other target reactant.

Use of a comprehensive wet process from the formation of the cerium compound particle up to the formulation can simplify the production process, possibly leading to improved stability of performance and production of the pharmaceutical formulation.

As described previously, the pharmaceutical composition of the present invention, formed into the semisolid or liquid preparation, has great advantages from the viewpoints of medication adherence, adsorptivity typically to phosphorus and uremic toxin precursor, and activity on other target reactant, and preparation making.

The pharmaceutical composition of the present invention may optionally be provided with coating such as sugar coating or enteric coating, given by any of known methods.

In the present invention, the pharmaceutical composition is preferably blended with an enteric substance.

The pharmaceutical composition of the present invention may optionally contain an additive that can be blended to pharmaceutical product, so far as the purpose of the present invention may be accomplished.

The optional component which may be blended to the pharmaceutical composition of the present invention is exemplified as follows.

(a) Sugar (Monosaccharide, Disaccharide, Oligosaccharide, or Polysaccharide)

The monosaccharide is exemplified by glucose, fructose or galactose, sugar alcohol, mannitol, xylitol, inositol, and sorbitol; the disaccharide is exemplified by sucrose, lactose, maltose, and trehalose; the oligosaccharide is exemplified by polymer of the aforementioned monosaccharide; and the polysaccharide is exemplified by dextrin, and hydroxyethyl starch.

These sugars may be used alone or in combination of two or more kinds, among which dextrin, trehalose, or mixture of them is preferably used.

(b) Electrolyte

Electrolyte for maintaining good biological function or electrolytic balance of body fluid is exemplified by sodium, potassium, calcium, magnesium, zinc, iron, copper, manganese, and iodine.

These electrolytes may be contained as an inorganic electrolyte component, or as an organic electrolyte component.

The inorganic electrolyte component is exemplified by salts of alkali metals or alkaline earth metals, such as chloride, sulfate, and carbonate.

The organic electrolyte component is exemplified by salts formed between organic acids such as citric acid, lactic acid, amino acids (for example, glutamic acid, or aspartic acid), alginic acid, malic acid, or gluconic acid, with inorganic bases such as alkali metals or alkaline earth metals.

(c) Vitamin B1

So-called active vitamins (for example, vitamin B1 nitrate or fursultiamine) may be used as vitamin B1, aiming at smooth sugar metabolism.

(d) Dietary Fiber

Dietary fiber, aimed at improving intestinal bacterial flora, suppressing intestinal mucosal atrophy, and improving stool form, is exemplified by water-soluble dietary fibers such as indigestible dextrin and polydextrose.

The pharmaceutical composition of the present invention may optionally have, added or blended thereto besides the aforementioned component, various kinds of nutrient, vitamin, flavor, colorant, sweetener, antioxidant, excipient, lubricant, fluidizing agent, binder, disintegrant and so forth, which may be used singly, or in combination of two or more kinds thereof, within the range the object of the present invention may be accomplished.

The pharmaceutical composition of the present invention may be ingested between meals, before meal, during meal, or after meal.

In particular, with cerium oxide-based component contained as the active ingredient, the pharmaceutical composition becomes ingestible between meals or during meal, unlike, for example, lanthanum carbonate that essentially requires low-pH gastric acid for dissolution and action. There is no concern about generation of carbon dioxide gas or pH elevation, due to interaction with the gastric acid. It is therefore not necessary to limit the dose in consideration of solubility that depends on pH, and to limit the timing of ingestion for effective action.

While approximately 40% of users of the adsorbent medicine reportedly forget to take the medicine, as delayed ingestion of the inventive pharmaceutical composition that contains cerium compound will expectedly adsorb phosphorus and so forth in the gastrointestinal tract other than the stomach, the cerium compound can demonstrate the effect as the active ingredient without being affected by the timing of ingestion.

(5) Application of Pharmaceutical Composition

The pharmaceutical composition of the present invention, containing the cerium compound, has an effect of lowering the measured level, or an effect of suppressing elevation of the measured level, of serum creatinine (CRE) and/or blood urea nitrogen (BUN).

That is, the pharmaceutical composition of the present invention may be used as a therapeutic agent for kidney disease. The pharmaceutical composition of the present invention may also be used for reducing, maintaining, or suppressing elevation, of serum creatinine (CRE) level and/or blood urea nitrogen (BUN) level.

Note that the kidney disease in the present invention means the state of decreased renal function typically due to chronic kidney disease, acute kidney injury, or chronic renal failure. Note also that the kidney disease in the present invention not only means disease relevant to decreased renal function, but also encompass disease of other organ associated to the decreased renal function. The disease of other organ is exemplified by various diseases induced by uremic toxins, such as heart and vascular diseases.

The treatment of kidney disease in the present invention includes treatment for any disorder caused by kidney disease, such as suppression and/or prevention of decrease in renal function; maintenance of renal function; restoration or improvement of renal function; and prevention, suppression, improvement, or treatment of diseases associated to the decreased renal function.

The kidney disease to which the pharmaceutical composition of the present invention is applicable is preferably exemplified by chronic kidney disease (CKD), acute kidney injury (AKI), and chronic renal failure.

The aforementioned cerium compound acts to reduce any substance that can accumulate in the body with kidney disease. That is, the pharmaceutical composition of the present invention is an agent for reducing uremic toxin or precursor thereof. The pharmaceutical composition of the present invention is also applicable to treatment of uremia. The pharmaceutical composition of the present invention is still also applicable to treatment, suppression or improvement of uremic symptoms.

A known mechanism is such that the aforementioned cerium compound demonstrates adsorptivity to the substance that can accumulate in the body with kidney disease.

In the present invention, the substance that can accumulate in the body with kidney disease means any substance capable of inducing uremic symptom (uremic toxin), and/or uremic toxin precursor. Preferred substances that the cerium compound can adsorb are exemplified by uremic toxin precursors such as tryptophan, kynurenine, serotonin, tryptan, indoles (indole acetic acid, indole propionic acid, indole lactic acid, indole, etc.), tyrosine, p-cresol, phenol, phosphatidylcholine, carnitine, and trimethylamine (TMA).

With the adsorptivity to the uremic toxin precursor, the pharmaceutical composition of the present invention can excrete the uremic toxin precursor in the body to the outside of the body, and can reduce the residual uremic toxin in the body as a consequence. That is, the pharmaceutical composition of the present invention may be used as an adsorbent of the uremic toxin precursor.

Note however that the action mechanism by which the pharmaceutical composition of the present invention reduces the uremic toxin or the precursor thereof is not limited to the above mechanisms. That is, the cerium compound may also be involved in suppressing generation of the uremic toxin or the precursor thereof.

This sort of action mechanism is typically such that the cerium compound acts to decompose or detoxify the uremic toxin or the precursor thereof. The uremic toxin or the precursor thereof to be acted on is exemplified by tryptophan, kynurenine, serotonin, tryptan, indoles (indole acetic acid, indole propionic acid, indole lactic acid, indole, etc.), tyrosine, p-cresol, phenol, phosphatidylcholine, carnitine, trimethylamine (TMA), indoxyl sulfate, p-cresylsulfate, phenyl sulfate, and trimethylamine N-oxide (TMAO).

The cerium compound may also act to reduce the activity (enzyme inhibition) of any enzyme that metabolizes food-derived component to the uremic toxin precursor or the uremic toxin. The enzyme to be acted on is exemplified by tryptophan 2,3-dioxygenase (TDO), tryptophan hydroxylase (TPH), aromatic L-amino acid decarboxylase (AADC), tryptophanase, tyrosine phenol lyase (β-tyrosinase), and trimethylamine lyase.

The pharmaceutical composition of the present invention has phosphorus adsorptivity, and has an effect of lowering the measured level of serum phosphorus (IP), or an effect of suppressing elevation of the measured value.

That is, the pharmaceutical composition of the present invention can also be used as an agent for reducing or suppressing elevation of serum phosphorus (IP) level, or as a phosphorus adsorbent. The pharmaceutical composition of the present invention may also be an agent for reducing, maintaining, or suppressing elevation, of serum phosphorus (IP) level.

The pharmaceutical composition of the present invention having the aforementioned effects may be used for preventing or treating various diseases typically caused by excessive absorption of various components from meal, or excessive intake of phosphorus, such as hyperphosphatemia, renal failure, and osteoporosis.

The pharmaceutical composition of the present invention also has an effect of not increasing the blood alanine aminotransferase (ALT) level upon administration. That is, the pharmaceutical composition of the present invention has characteristics that the ingestion thereof will not reduce the liver function, unlike the prior adsorbent that contains lanthanum carbonate.

An embodiment of the present invention is also exemplified by use of the cerium compound, in production of a therapeutic agent for kidney disease. Other mode may relate to use of the cerium compound in production of a phosphorus adsorbent; and use of the cerium compound in production of a pharmaceutical composition for reducing, or suppressing elevation of serum creatinine (CRE) level and/or blood urea nitrogen (BUN) level.

An embodiment of the present invention is also exemplified by use of the cerium compound as an active ingredient for treatment of kidney disease. Still other mode may relate to use of the cerium compound as an active ingredient for phosphorus adsorption; and use of the cerium compound as an active ingredient for reducing, maintaining, or suppressing elevation of serum creatinine (CRE) level and/or blood urea nitrogen (BUN) level.

An embodiment of the present invention is exemplified by the cerium compound for use for treatment of kidney disease. Still other mode may relate to the cerium compound for use in phosphorus adsorption; and the cerium compound for reducing, or suppressing elevation of serum creatinine (CRE) level and/or blood urea nitrogen (BUN) level.

An embodiment of the present invention is exemplified by a method for treating kidney disease, including administering the cerium compound to a subject in need of treatment of kidney disease. Still other modes of the present invention relate to a method for treating kidney disease, including administering the cerium compound to a subject in need of treatment for reducing or suppressing elevation of serum phosphorus (IP) level; or a method for treating kidney disease, including administering the cerium compound to a subject in need of treatment for reducing or suppressing elevation of serum creatinine (CRE) level and/or blood urea nitrogen (BUN) level. Still other modes of the present invention may include a method for treating kidney disease, which includes administering the cerium compound to a subject whose serum phosphorus (IP) level needs to be reduced, maintained, or suppressed from elevating by treatment; or a method for treating kidney disease, which includes administering the cerium compound to a subject whose serum creatinine (CRE) level and/or blood urea nitrogen (BUN) level need to be reduced, maintained, or suppressed from elevating by treatment.

The pharmaceutical composition of the present invention may also be used in the form of hemodialysis composition.

The hemodialysis composition is exemplified by dialysate, and filler to be packed in a column.

The dialysate is exemplified by a form in which the aforementioned cerium compound is blended with an ordinary dialysate that typically contains sodium, potassium, calcium, magnesium, chlorine, hydrogen carbonate, or glucose.

The filler is exemplified by a form in which the cerium compound is held on a pharmaceutically acceptable carrier. The carrier is exemplified by polysaccharides such as cellulose, gellan gum, sulfated gellan, dextran, chitosan, and cellulose acetate; proteins such as gelatin, collagen, and elastin; and resins such as polystyrene, polyacrylic acid, polyacrylamide, polyvinyl alcohol, and polyethylene.

The pharmaceutical composition of the present invention preferably follows a mode in which the aqueous dispersion of cerium compound is formulated into any desired dosage form, while keeping the cerium compound dispersed in the aqueous solution.

Since the entire process, from the formation of the cerium compound particle as an active ingredient up to the formulation, is comprehensively carried out by the wet process, while totally excluding any dry state where the particle would aggregate, the formulation process may be freed from a risk of aggregation of the cerium compound particle. Suppression of the particle aggregation can also keep a sufficient area of reaction interface, namely the surface of the particle, sufficiently large, thus enabling most effective demonstration of the adsorptivity to phosphorus or uremic toxin precursors and of the activity exerted on any other target reactant.

Use of a comprehensive wet process from the formation of the cerium compound particle up to the formulation can simplify the production process, possibly leading to improved stability of performance and stability of production of the pharmaceutical formulation.

Next, 1. jelly agent, and 2. enteric pharmaceutical composition, which are preferred forms of the pharmaceutical composition of the present invention, will be detailed below.

<1. Jelly Agent>

A method for producing a jelly agent that contains the particle of cerium oxide as an active ingredient will be explained below as one mode of the pharmaceutical composition of the present invention.

A jelly-like dosage form (jelly agent) is usually brought about with a gelling agent. The gelling agent is not particularly limited as long as it is pharmaceutically acceptable, and can gelate and semi-solidify the aforementioned aqueous dispersion of cerium compound only to a necessary extent, without hindering the effect of the present invention. The gelling agent is exemplified by gelatin, carrageenan, pectin, gum arabic, xanthan gum, gellan gum, agar, tragacanth gum, tamarind seed gum, guar gum, locust bean gum, starch, pullulan, chitosan, tara gum, alginic acid or a salt thereof, glucomannan, sodium alginate, potassium alginate, and sodium polyacrylate.

Any one or more kinds of them may be used. Since high-molecular polysaccharide has optimum pH to form a gelled state, a combination of locust bean gum with xanthan gum, a combination of locust bean gum with carrageenan, or the above combinations with agar additionally, for example, is preferred in order to stably maintain the gelled state at pH 5 to 8.

Method for preparing the jelly agent is not particularly limited, and may be such that all components may be mixed at a time; or, a part of the components are separately mixed to prepare a mixture, to which other components or a mixture of other components may be added.

Mixing operation of the individual components may take place at normal temperature, or under heating.

The gelling agent may be used at any timing from the particle formation of the cerium compound, up to the formulation. Some of the gelling agent with protective colloid formability may also be used as the dispersant, when forming the cerium compound particle, under suitably adjusted production conditions.

The content of the gelling agent, although variable typically depending on the gelling agent to be used, and the pH of the aqueous dispersion of cerium compound, is usually within the range from 0.01 to 10% by mass, preferably from 0.02 to 8% by mass, and more preferably from 0.03 to 6% by mass. The content of the gelling agent, if smaller than 0.01% by mass, would result in insufficient gelation, whereas the content exceeding 10% by mass would make the jelly agent too hard and less ingestible.

The jelly agent is also preferred to have low viscosity, and smooth touch to the palate for easy ingestion. More specifically, the jelly agent preferably has a viscosity of 100 Pa·s or smaller, more preferably 10 Pa·s or smaller, and even more preferably 1 Pa·s or smaller.

<2. Enteric Pharmaceutical Composition>

Next, a pharmaceutical composition that contains an enteric substance (also referred to as enteric pharmaceutical composition, hereinafter) will be detailed.

The enteric substance usable in the present invention is not particularly limited as long as it is effective without hindering the effect of the present invention, and is specifically exemplified by hydroxyethyl cellulose (HEC), hydroxypropyl cellulose (HPC), hydroxypropyl methyl cellulose (HPMC), cellulose acetate phthalate (CAP), cellulose acetate succinate (CAS), cellulose acetate trimellitate (CAT), hydroxypropyl methylcellulose acetate phthalate (HPMCP), hydroxypropyl methylcellulose acetate succinate (HPMCAS), hydroxypropyl methylcellulose acetate trimellitate (HPMCAT), carboxymethyl ethyl cellulose (CMEC), ethyl cellulose, polyvinyl acetate phthalate, vinyl acetate-maleic anhydride copolymer, polyacrylate, polymethacrylate, copolymer of polyacrylate and polymethacrylate, aminoalkyl methacrylate copolymer, methacrylic acid copolymer L, methacrylic acid copolymer LD, methacrylic acid copolymer S, styrene-maleic acid copolymer (SMA), and shellac.

The enteric pharmaceutical composition is obtainable by coating or encapsulating the cerium compound with an enteric substance, or dispersing the enteric substance around the cerium compound, so as to suppress the cerium compound as an active ingredient from acting on a substance other than the target reactant. The production method is specifically exemplified by a method for coating or encapsulating the cerium compound with the enteric substance, and a method for coating or encapsulating a solid preparation with the enteric substance.

The method for coating or encapsulating, when coating or encapsulating the cerium compound with the enteric substance, may rely upon any of known techniques without special limitation.

Here, the coating means that the cerium compound is coated and surrounded by the enteric substance, meanwhile, the encapsulation means that the cerium compound is embraced in the enteric substance. The cerium compound, when coating or encapsulating it with the enteric substance, is preferably coated or encapsulated with the enteric substance, while keeping the cerium compound in the form of aqueous dispersion.

In the present specification, the cerium compound thus coated or encapsulated with the enteric substance will be referred to as enteric cerium compound.

The cerium compound thus coated or encapsulated may further be formulated typically into various solid preparations, semi-solid preparations, and liquid preparations, by any of known methods.

In the present invention, the semisolid or liquid preparation that contains the enteric cerium compound is particularly preferred.

The semisolid or liquid preparation, when intended, may have any appearance (dosage form) without special limitation, which is preferably exemplified by semisolid preparations such as jelly agent and whipped preparation; and liquid preparations such as syrup, suspension, and emulsion.

The enteric pharmaceutical composition, in the form of semisolid or liquid preparation, is obtainable by mixing the enteric cerium compound with a solution that optionally contains various additives.

More specifically, the enteric pharmaceutical composition is obtainable by adding the enteric cerium compound into a solution that contains various additives, followed by mixing; conversely by adding the various additives into the solution of the enteric cerium compound, followed by mixing; or by adding and mixing them at a time.

The enteric substance may be mixed at any stage of the period from the formation of particles of the cerium compound, up to the formulation. The enteric substance having a property of forming protective colloid may also be used as the dispersant when forming the cerium compound particle, under suitably adjusted production conditions.

When producing the semisolid or liquid preparation, the conditions such as the temperature, the addition and mixing speed, the mixing time, and the stirring and mixing force are suitably adjustable without special limitation, within a range that does not hinder the effect of the present invention.

The stirring may rely upon any of known methods, typically with use of a mixer such as homogenizer.

The enteric pharmaceutical composition in a dosage form of semisolid or liquid preparation is applicable in its intact form as the semisolid or liquid preparation, or is applicable by further encapsulating the obtained semisolid or liquid enteric pharmaceutical composition typically in a capsule.

The appearance (dosage form) of the solid preparation to be coated or encapsulated with the enteric substance is not particularly limited, and is exemplified by tablets (including OD tablet (orally disintegrating tablet), chewable tablet, foamed tablet, rapid release tablet, and sugar-coated tablet), powder, granule, capsules (including hard capsule and soft capsules), pill, and troche.

The solid preparation may be coated or encapsulated with use of any of known coater. The coater is exemplified by pan coater, drum type coater, fluidized bed coater, agitated fluidized bed coater, and tumbling fluidized bed coater. Spray device applicable herein may, for example, be air spray, airless spray, or three-fluid spray.

The temperature at which the enteric substance is fed to the coater is appropriately set, preferably at 0 to 50° C., more preferably at 2 to 40° C., and even more preferably at 5 to 30° C.

Process after the coating or encapsulation may rely on any method capable of dewatering to dryness, without special limitation. For example, the solid preparation may be heated or air-dried, typically in the coater, or after taken out from the coater. The drying temperature may be 15 to 95° C.

The content of the enteric substance varies depending on the dosage form, size and amount of the composition to be coated or encapsulated; or the type and amount of the additive, and is suitably adjustable. In a preferred mode, the content of the enteric substance with respect to the total amount of the enteric pharmaceutical composition (completed preparation) is preferably 0.001 to 99%, more preferably 0.005 to 95%, and even more preferably 0.01 to 90%.

With the content of the enteric substance adjusted as described above, rate of dissolution or desorption of the enteric substance from the cerium compound may be suitably controlled.

The content of the enteric substance relative to the cerium compound, in ratio by mass, is preferably 1:0.001 to 1:1000, more preferably 1:0.002 to 1:100, and even more preferably 1:0.003 to 1:10.

With the ratio by mass adjusted as described above, the rate of dissolution or desorption of the enteric substance from the cerium compound may be suitably controlled.

The enteric substance can dissolve upon arrival at a predetermined pH, and can release the active ingredient that has been coated or encapsulated in a pH-dependent manner. In the present embodiment, in which the periphery of the cerium compound as an active ingredient, particularly the adsorption site where the adsorbate may be adsorbed, is being covered or encapsulated by the enteric substance therearound, or in which the enteric substance is kept dispersed around the cerium compound, the enteric pharmaceutical composition, after being ingested and before arrival at the gastrointestinal tract, particularly at the small intestine, may be suppressed from reacting with any unintended adsorbate, and can demonstrate the effect of the cerium compound particularly in the large intestine.

The enteric pharmaceutical composition that contains the enteric substance stays insoluble while being neither degraded nor deactivated, in the stomach where low pH is maintained. On the other hand, the enteric substance dissolves at approximately pH 5.0 to 6.5 or above. That is, the enteric pharmaceutical composition of the present invention can release the cerium compound particularly in the large intestine, freed from concern about excessive adsorption of phosphorus in the gastrointestinal tract, particularly before reaching the small intestine, and thus may be used without causing hypophosphatemia.

The enteric pharmaceutical composition having the above characteristics is also applicable to patients who do not need to suppress the serum phosphorus level, for example, for those with stage 1 or 2 chronic kidney disease.

The enteric pharmaceutical composition having the above characteristics, capable of demonstrating the effect mainly in the large intestine, can therefore act on excessive uremic toxin or the precursor thereof that reside in the intestine, making them the adsorbate or the target reactant.

The present inventors also prepared a dispersion (aqueous dispersion of cerium oxide) having cerium oxide fine particle and cerium(III) ion commingled therein, as the aqueous dispersion of cerium oxide prepared by the method of the aforementioned Procedure 2. The present inventors then found that cerium was absorbed into the body, by administering the aqueous dispersion of cerium oxide, having cerium(III) ion commingled therein. That is, the pharmaceutical composition of the present invention may also function in a mode in which the cerium compound is absorbed through the intestinal tract into the body, and demonstrates a desired effect in the form of cerium compound and/or cerium ion.

The intestinal tract in the present invention typically means small intestine (jejunum, ileum, duodenum, etc.), and large intestine (cecum, colon, rectum, etc.). The intestinal absorbability means that substances such as active ingredients are absorbed through the intestinal tract into the body (mainly into blood).

The pharmaceutical composition of the present invention is preferably formulated in a form that can demonstrate intestinal absorbability. The formulation in the present invention preferably allows cerium in the intestinal tract to exist in a trivalent state. The processing form of the formulation is not particularly limited, and is suitably selectable typically from the processing form of the aforementioned oral preparation.

In a preferred mode, the cerium compound according to the present invention is absorbed through the intestinal tract into the blood to reach various organs including kidney, thereby demonstrating the action and effect of the present invention.

The pharmaceutical composition of the present invention, when formulated to demonstrate intestinal absorbability, preferably has a molecular weight of cerium compound of 5,000 or smaller, which is more preferably 2,000 or smaller, and even more preferably 600 or smaller.

The present inventors also found that the blood uremic toxin level was reduced, by administering the aqueous dispersion of cerium oxide having cerium(III) ion and cerium oxide commingled therein.

That is, the pharmaceutical composition of the present invention may be used for reducing, maintaining, or suppressing elevation, of uremic toxin in the body, which is more specifically uremic toxin in the blood. Another preferred mode relates to the method for treating kidney disease, which includes reducing, maintaining, or suppressing elevation, of the uremic toxin level in the body of the subject. More preferably, the method for treating kidney disease may include reducing, maintaining, or suppressing elevation, of the uremic toxin level in the blood of the subject.

The uremic toxin to be reduced, maintained, or suppressed from elevating in the embodiment is preferably one or two or more kinds selected from indoxyl sulfate, p-cresyl sulfate, phenyl sulfate, and trimethylamine-N-oxide (TMAO).

EXAMPLES

Example 1

<Preparation of Particle 1 (Present Invention)>

In a reaction vessel equipped with a stirrer, placed were 134.69 g of water, 65.66 g of cerium chloride heptahydrate (from Nikki Corporation), and 1.22 g of sodium acetate (from FUJIFILM Wako Pure Chemical Corporation) as a dispersant, and the solution with a cerium concentration of 1.1 mol/L was kept stirred at 20° C.

To the solution, 4.19 g of a 35.4% by mass hydrogen peroxide solution (from Kanto Chemical Co., Inc.) was added, and the content was kept stirred for 5 minutes.

Further, 94.67 g of a 4 mol/L aqueous sodium hydroxide solution (from FUJIFILM Wako Pure Chemical Corporation) was added, and the content was kept stirred for 5 minutes.

The solution was then heated to 50° C. over 10 minutes, kept stirred for 120 minutes, and then cooled down to room temperature.

The final cerium concentration of the solution was found to be 0.7 mol/L.

The reaction solution was then filtered, to obtain an aqueous dispersion having a cerium oxide concentration of 11.9% by mass.

The obtained particle, observed under a transmission electron microscope (TEM), was found to have an average particle size of 4.0 nm.

A transmission electron micrograph (TEM) photograph of particle 1 is shown in FIG. 1.

<Preparation of Particles 2 to 6 (Present Invention), and Preparation of Particle 7 (Comparative Example)>

Particles 2 to 6 were prepared in the same way as particle 1, except that 1.22 g of sodium acetate was replaced with the dispersants listed in Table 1.

Also, particle 7 was prepared with reference to Example 1 of JP 5614529 A.

More specifically, 150.00 g of water and 6.00 g of cerium chloride heptahydrate were placed in a reaction vessel equipped with a stirrer, and the solution was kept stirred at 20° C.

To the solution, added was a hydrogen peroxide solution prepared by preliminarily mixing 48.45 g of water and 1.55 g of a 35.0% by mass hydrogen peroxide solution, and the content was kept stirred for 30 minutes.

Further, a 29.1% by mass ammonia water was added to adjust the pH to 10.

The solution was then heated to 85° C. over 20 minutes, kept stirred for 12 hours, and then cooled down to room temperature.

The final cerium concentration of the solution was found to be less than 0.1 mol/L.

Thereafter, the reaction solution was filtered, the collected matter was washed with water, filtered, and dried at 50° C.

The average particle sizes of particles 2 to 7 are summarized in Table 1.

TABLE 1

| Particle No. | Dispersant | Amount of dispersant/g | Average particle size/nm | |
|---|---|---|---|---|
| Particle 1 | Sodium acetate | 1.22 | 4 | Present invention |
| Particle 2 | Sodium propionate | 1.42 | 4.2 | Present invention |
| Particle 3 | Sodium butyrate | 1.63 | 4.1 | Present invention |
| Particle 4 | γ-aminobutyric acid | 1.82 | 5.2 | Present invention |
| Particle 5 | 6-aminohexanoic acid | 2.28 | 5.3 | Present invention |
| Particle 6 | Sodium polyacrylate | 9.72 | 4.2 | Present invention |
| Particle 7 | None | 0 | 120 | Comparative example |

As summarized in Table 1, the particle size of the cerium compound particle was successfully reduced by forming the particle in the presence of the dispersant.

[Example 2] <Phosphorus Adsorption Experiment>

Example 2-1

Three mmol/L aqueous phosphoric acid solutions with pH 1.0 and pH 7.0 were prepared. The pH was adjusted with hydrochloric acid.

A freely selectable amount of a commercially available cerium oxide particle with a particle size of 43 nm (from Solvay Specialty Chem Japan Co., Ltd.) was added to each of the aqueous solutions.

Each of these dispersions was kept stirred at 38° C. for one hour in a thermostatic chamber.

Also a freely selectable amount of each of cerium oxide particles having particle sizes of 79 nm, 144 nm, and 209 nm was added in the same way, and each of these dispersions was kept stirred at 38° C. for one hour in a thermostatic chamber.

Each solution was then centrifuged (10,000×g, 5 min) for solid-liquid separation, and the supernatant was collected.

Phosphoric acid remained in the collected supernatant was evaluated by colorimetry, with use of a commercially available phosphoric acid detection reagent (Trade name: PiBlue Phosphate Assay Kit; POPB-500, from BioAssay Systems, Inc.) that contains molybdenum blue and malachite green. Results are summarized in FIGS. 2 to 4.

The results summarized in FIGS. 2 and 3 teach that the smaller the average particle size, the higher the adsorptivity to phosphoric acid. Hence, use of the cerium compound particle, having a small particle size and thus having a large total surface area, was demonstrated to successfully yield the pharmaceutical composition having high adsorptivity to phosphorus.

It was also confirmed from FIG. 4 that the smaller the particle size, the smaller the pH dependency.

Example 2-2

3 mmol/L aqueous phosphoric acid solutions with pH 7.0 was prepared. The pH was adjusted with Bis-Tris HCl buffer solution (phosphoric acid and sodium chloride from FUJI-FILM Wako Pure Chemical Corporation; Bis-Tris from Dojindo Laboratories).

A freely selectable amount of particle 1 was added to each of the aqueous solutions.

Each of these dispersions was kept stirred at 38° C. for one hour in a thermostatic chamber.

Also, a freely selectable amount of particle 7 was added in the same way, and the dispersion was kept stirred at 38° C. for one hour in a thermostatic chamber.

Each solution was then centrifuged (10,000×g, 5 min) for solid-liquid separation, and the supernatant was collected.

Phosphoric acid remained in the collected supernatant was evaluated by colorimetry, with use of a commercially available phosphoric acid detection reagent (Trade name: PiBlue Phosphate Assay Kit; POPB-500, from BioAssay Systems, Inc.) that contains molybdenum blue and malachite green. Results are summarized in FIG. 5.

The amount of cerium oxide required to entirely adsorb 3 mmol of phosphoric acid was found to be 1.9 g for particle 1, and 28.5 g for particle 7 (FIG. 5).

Particle 1 prepared using the dispersant was found to have higher phosphoric acid absorption than particles 7 prepared without a dispersant.

Example 2-3

Three mmol/L aqueous phosphoric acid solutions with pH 2.5 and pH 7.0 were prepared. The pH was adjusted with Bis-Tris HCl buffer solution and glycine-HCl buffer solution (phosphoric acid, sodium chloride, and glycine from FUJI-FILM Wako Pure Chemical Corporation; Bis-Tris from Dojindo Laboratories).

A freely selectable amount of particle 1 was added to each of the aqueous solutions.

Each of these dispersions was kept stirred at 38° C. for one hour in a thermostatic chamber.

Also, a freely selectable amount of a commercially available lanthanum carbonate reagent (from Nikki Corporation) was added in the same way, and each dispersion was kept stirred at 38° C. for one hour in a thermostatic chamber.

In this process, the pH 2.5 solution having lanthanum carbonate added thereto was found to contain bubbles, indicating gas production. On the other hand, the solution with particle 1 was not found to produce bubbles.

Each solution was then centrifuged (10,000×g, 5 min) for solid-liquid separation, and the supernatant was collected.

Phosphoric acid remained in the collected supernatant was evaluated by colorimetry, with use of a commercially available phosphoric acid detection reagent (Trade name: PiBlue Phosphate Assay Kit; POPB-500) that contains molybdenum blue and malachite green.

Accordingly, the mass of the particle required to entirely adsorb 3 mmol of phosphoric acid was found to be 1.45 g at pH 2.5, and 1.87 g at pH 7.0 for particle 1; meanwhile 1.15 g at pH 2.5, and 5.95 g at pH 7.0 for lanthanum carbonate.

The reciprocal of the mass of the particle required to entirely adsorb 3 mmol of phosphoric acid was defined as adsorptivity to phosphorus, and was illustrated in FIG. 6.

The adsorptivity to phosphorus of particle 1, which is the fine particle of cerium oxide of the present invention, was found to be 79% of that of lanthanum carbonate, conversely meaning that a 21% increase of the mass would make the adsorptivity to phosphorus comparable to that of lanthanum carbonate. On the other hand, the adsorptivity to phosphorus of particle 1 in the neutral range was found to be 318% of that of lanthanum carbonate, proving excellent adsorptivity. These results teach that the phosphorus adsorbent (pharmaceutical composition) that contains the cerium compound of the present invention is less pH-dependent, and can demonstrate overall excellent adsorptivity to phosphorus.

That is, the phosphorus adsorbent (pharmaceutical composition) of the present invention demonstrates large adsorptivity to phosphorus particularly in the neutral pH range, and the adsorptivity is not susceptible to the pH environment in the gastrointestinal tract, typically making the user no longer necessary to be conscious of the timing of ingestion.

Example 3

To 8.933 g of water, added were 0.067 g of cerium chloride heptahydrate (from Nikki Corporation) and 1.000 g of casein phosphopeptide (from FUJIFILM Wako Pure Chemical Corporation), and the solution was kept stirred at 25° C. for one hour (aqueous solution A).

To 8.969 g of water, added were 0.032 g, in solid content, of particle 1 of Example 1, and 1.000 g of casein phosphopeptide, and the aqueous solution was kept stirred 25° C. for one hour (aqueous solution B).

The solution was then centrifuged (10,000×g, 5 min) for solid-liquid separation, and the supernatant was collected.

Then, the supernatant of each of aqueous solutions A and B was subjected to spectrometry with use of a spectrophotometer, to find absorption attributable to $Ce^{3+}$.

An aqueous solution of cerium chloride heptahydrate and an aqueous solution of casein phosphopeptide were prepared, and a calibration curve was then prepared for correction of measured values.

Assuming now that an absorption spectral intensity of the aqueous solution of cerium chloride heptahydrate having the same molar concentration but free of casein phosphopeptide as 1, proportions of intensity of the aqueous solutions A and B were estimated as 0.27 and approximately 0, respectively.

From the results, 73% of free cerium ion in aqueous solution A was presumably consumed to form a complex in the presence of casein phosphopeptide, and was not detectable. In contrast, the fine particle of cerium oxide in aqueous solution B was understood to remain unchanged.

This suggests that casein phosphopeptide, when coexisting with the metal ion, would react therewith to form a complex.

Casein phosphopeptide, when mediated by the metal ion, would form the metal complex which may be absorbed through the intestine, meanwhile the insoluble fine particle like in the present invention was suggested to be free of such concern.

Example 4

<Adsorption Experiment of Uremic Toxin Precursor>

Aqueous dispersion of cerium compound was prepared by the procedures below.

(1) In a reaction vessel equipped with a stirrer, placed were 134.69 g of water, 65.66 g of cerium chloride heptahydrate (from Nikki Corporation), and 1.22 g of sodium acetate (from FUJIFILM Wako Pure Chemical Corporation) as a dispersant, and the solution with a cerium concentration of 1.15 mol/L was kept stirred at 20° C.

(2) To the solution, 4.19 g of a 35.4% by mass hydrogen peroxide solution (from Kanto Chemical Co., Inc.) was added, and the content was kept stirred for 5 minutes.

(3) Further, 100.68 g of a 4 mol/L aqueous sodium hydroxide solution (from FUJIFILM Wako Pure Chemical Corporation) was added, and the content was kept stirred for 5 minutes.

(4) The solution was then heated to 50° C. over 10 minutes, kept stirred for 90 minutes, and then cooled down to room temperature, to prepare the particle.

The cerium concentration of the solution at this stage was found to be 0.72 mol/L.

(5) To the obtained aqueous dispersion of cerium oxide, added were 275.8 g of water, and subsequently 30.7 g of a 1 mol/L aqueous sodium hydroxide solution (FUJIFILM Wako Pure Chemical Corporation), the mixture was stirred, and then allowed to stand still for precipitation. Thereafter, 312.5 g of the supernatant was removed, to obtain a 10.0% by mass aqueous dispersion of cerium oxide (aqueous dispersion of cerium compound).

Hereinafter, sample preparation for adsorption experiment will be described.

To the thus prepared aqueous dispersion of cerium oxide (solid content concentration: 10% by mass), water was added to adjust the cerium oxide concentration to 10 g/L.

On the other hand, each of L-tryptophan (from FUJIFILM Wako Pure Chemical Corporation), indole acetic acid (from Sigma-Aldrich), indole lactic acid (from FUJIFILM Wako Pure Chemical Corporation), and indole (from FUJIFILM Wako Pure Chemical Corporation) was selected as an additive, and a 1.0 mmol/L aqueous additive solution was prepared.

Then, 0.5 mL of the 10 g/L aqueous dispersion of cerium oxide was weighed in a 15 mL polypropylene centrifuge tube, to which 4.0 mL of water was added, and the mixture was mixed under stirring. Next, 0.5 mL of aqueous L-tryptophan solution was added, and the mixture was mixed under stirring.

The individual aqueous solutions of indole acetic acid, indole lactic acid, and indole were added in the same way to prepare samples.

Besides them, a sample solely composed of the aqueous dispersion of cerium oxide was prepared as a correction sample, and samples solely composed of aqueous solutions of the individual additives were prepared as pre-adsorbed (unadsorbed) reference samples.

The thus prepared mixed solutions were individually kept warm in a thermostatic chamber set at 38° C. After one hour, the individual samples were taken out from the thermostatic chamber, centrifuged (10,000×g, 5 min), and the supernatants were individually collected.

The individual supernatant samples thus collected were subjected to measurement of absorbance with use of a spectrophotometer MultiSpec-1500 (from Shimadzu Corporation).

The aqueous additive solutions of L-tryptophan, indole acetic acid, indole lactic acid, and indole show an absorption peak at approximately 280 nm attributable to their structures. Since, however, the aqueous dispersion of cerium oxide also shows absorption in the vicinity thereof, correction was performed using the correction sample solely composed of the aqueous dispersion of cerium oxide. Also, each of the samples solely composed of the individual additive was used as the pre-adsorbed (unadsorbed) reference sample.

Assuming now the absorbance of the pre-adsorbed (unadsorbed) reference samples as 100%, differences in absorbance therefrom of the cerium oxide-added supernatant samples were determined as the adsorption ratio at which each of the individual additive was adsorbed to cerium oxide. Results are summarized in FIG. 7.

All of L-tryptophan, indole acetic acid, indole lactic acid, and indole were found to individually adsorb to the cerium oxide particle. The amount of adsorption was found to increase in the order of L-tryptophan, indole acetic acid and indole lactic acid, and indole, where adsorption of indole acetic acid and indole lactic acid were found equivalent.

These results demonstrated that the pharmaceutical composition of the present invention, containing the cerium compound as an active ingredient, was found to adsorb indole or the like, which is a precursor of uremic toxin considered to be a cause for decreased renal function, and found to be effective for supporting, maintaining or improving the renal function.

[Example 5] <Animal Experiment>

Materials, feeds, and devices used for animal experiments in Example 5 are listed below.
Rats (from Japan SLC, Inc.)
Slc:Wistar rat, 5/6 nephrectomized
(1) Transferred at 3 weeks of age from the breeder to the Biotechnical Center of Japan SLC, Inc.
(2) The left kidney 2/3 nephrectomized at 4 weeks of age.
(3) The right kidney totally nephrectomized at 5 weeks of age.
(4) Delivered at 6 weeks of age.
Powder feed (from Funabashi Farm Co., Ltd.)
AIN-93G modified powder feed (protein source substituted with soy protein)
Mixer for feed preparation (from Bosch GmbH)
Compact kitchen machine MUM4415JP
Water or hot water
Used after passing through a water purifier, and boiling in a pot.
Feed for laboratory animal, Labo MR Stock (from Nosan Corporation)
Lanthanum carbonate (from Nikki Corporation)

Lanthanum carbonate powder ($La_2(CO_3)_3 \cdot 12.7H_2O$; Lot No. 200801)

Wing blood collection needle for laboratory animal CL-4597 (from CLEA Japan, Inc.)

The aqueous dispersion of cerium compound was prepared by the same procedures as in Example 4.

The feed in the present invention was prepared by the following procedures.

(1) Weighed was 250 g of powder feed, and stirred with a kitchen machine.

(2) To the powder feed kept being stirred, added was 32.7 g of the prepared aqueous dispersion of cerium oxide (solid content concentration: 10% by mass) in small portions, the mixture was stirred with a kitchen machine for 3 minutes, the food attached to the wall face was once scraped off, and then the mixture was stirred again for 3 minutes. Approximately 110 mL of hot water was then added.

(3) The feed was once put together by hands, and further kneaded with a kitchen machine until it became homogeneous.

(4) The kneaded feed was molded into a cylindrical shape approximately 1 cm in diameter and 2.5 cm in length.

(5) The molded feed was dried for 2 days at room temperature under a fan, or at 38° C. in an incubator.

(6) After dried, the feed was weighed to estimate proportion of the residual moisture.

(7) The prepared feed was put in a zipper bag, and stored in a refrigerator.

The feed was prepared by repeating these steps (1) to (7) necessary number of times.

The rats were bred by the following procedures.

(1) The 5/6 nephrectomized model rats were weighed, and classified into three groups.

(2) Each group was acclimatized with MR stock feed, under ad libitum feeding and ad libitum water drinking. The feeding cage was conditioned at room temperature 22±2° C., under illumination 12 hours a day.

(3) The animals were then bred with the prepared special feed under ad libitum feeding and ad libitum water drinking. The feeding cage was conditioned similarly to the acclimatization period, at room temperature 22±2° C., under illumination 12 hours a day.

(4) On Days 0, 7, 14, 21, and 28, rats were bred in metabolic cages for 24 hours. The animals were fed with Labo MR stock on Day 0, and with the special feed on days thereafter, during which the amounts of feed consumption, water consumption, urine and feces were measured, and the urine and feces were sampled.

(5) The animals were taken out of the metabolic cage and weighed, followed by blood collection with a winged needle. Approximately 400 μL of blood was collected, incubated at room temperature for one hour, and then centrifuged (1,700×g, 20 min) to obtain serum.

Thereafter, (4) breeding in a metabolic cage, and (5) body weight measurement and blood collection, were repeated.

(6) On the final Day 28, the animals were fasted throughout the day, and then dissected. The animals were subjected to laparotomy under anesthesia, and exsanguinated to death by collecting blood through the inferior vena cava. The collected blood was centrifuged (1,700×g, 20 min) to obtain serum. Liver, kidney, spleen, small intestine, and stomach of the rats that were exsanguinated to death were sampled. The small intestine and stomach were dissected, removed contents, and rinsed twice with PBS. The above sequence of procedures was repeated three times to assign six animals to each group.

Comparative Example 1

A feed of Comparative Example 1 was prepared in the same way as in step (2) of the preparation of the feed of the present invention, except that the aqueous dispersion of cerium oxide was not added, that is, nothing was added, and that the amount of hot water was changed from approximately 110 mL to approximately 140 mL.

Comparative Example 2

A feed of Comparative Example 2 was prepared in the same way as in step (2) of the preparation of the feed of the present invention, except that 3.09 g of lanthanum carbonate powder was added in place of the aqueous dispersion of cerium oxide, and that the amount of hot water was changed from approximately 110 mL to approximately 140 mL.

Analysis of the collected blood sample was outsourced to Oriental Yeast Co., Ltd.

Analytical methods and analytical reagent for the individual test items will be listed below.

Serum creatinine (CRE): enzymatic method, L-type Wako CREM (from FUJIFILM Wako Pure Chemical Corporation)

Blood urea nitrogen (BUN): urease-GLDH method, reagent from Oriental Yeast Co., Ltd. (Oriental Yeast Co., Ltd.)

Serum phosphorus (IP): enzymatic method, Determiner L IP II (from Hitachi Chemical Diagnostics Systems Co., Ltd.)

Alanine aminotransferase (ALT): JSCC transferable method, L-type Wako ALTJ2 (from FUJIFILM Wako Pure Chemical Corporation)

The above four items were measured with use of Hitachi 7180 automatic analyzer.

ALT was measured only for blood samples collected on the last day.

Analytical values for serum creatinine (CRE), blood urea nitrogen (BUN), serum phosphorus (IP), and alanine aminotransferase (ALT) were illustrated in FIGS. 8 to 11, respectively.

The measured values of the groups to which cerium oxide was added were found to be lower than those for the group of Comparative Example 1 free of cerium oxide, in all test items. That is, the animals fed on the cerium oxide-containing feed were found to keep low levels of serum creatinine (CRE) and blood urea nitrogen (BUN) that indicate the renal function, and serum ALT (GPT) level that indicates the liver function.

The measured values of serum phosphorus (IP) of the cerium oxide-added groups were found equivalent to those of the lanthanum carbonate-added group of Comparative Example 2 (FIG. 8). This proved that the pharmaceutical composition of the present invention that contains cerium oxide can demonstrate, as a phosphorus adsorbent, effects equivalent to those of lanthanum carbonate.

On the other hand, the values of serum creatinine (CRE) and blood urea nitrogen (BUN) of the cerium oxide-added groups were found to remain constant without increasing, whereas the values of serum creatinine (CRE) and blood urea nitrogen (BUN) of the lanthanum carbonate-added groups were found to slightly increase as compared with the cerium oxide-added groups (FIGS. 9 and 10).

The cerium oxide-added group also demonstrated the serum ALT (GPT) level equivalent to those of the non-added group, meanwhile the lanthanum carbonate-added group demonstrated the serum ALT (GPT) level distinctively increased as compared with those of the non-added group (FIG. 11).

The results teach that the pharmaceutical composition of the present invention that contains the cerium compound as the active ingredient is not only effective in assisting, maintaining, or improving the renal function, but also does not induce degraded liver function, which has been observed upon ingestion of lanthanum carbonate, a conventionally used phosphorus adsorbent.

Example 6

Next, two kinds of jelly agents that contain the cerium compound of the present invention were prepared by the procedures below.

<Example 6-1> Gelling Agent: Gelatin (1) A water dispersion of cerium oxide with a cerium oxide concentration of 18.0% by mass was prepared with reference to the preparation of the aqueous dispersion of cerium compound described above, except in step (5), the amount of removal of the supernatant was modified.

(2) To 100.0 g of the aqueous dispersion of cerium oxide kept under stirring, added was 2.0 g of gelatin (FUJIFILM Wako Pure Chemical Corporation) in small portions, and the mixture was thoroughly mixed to obtain a jelly agent A.

<Example 6-2> Gelling Agent: Agar (1) A water dispersion of cerium oxide with a cerium oxide concentration of 18.0% by mass was prepared with reference to the preparation of the aqueous dispersion of cerium compound described above, except in (5), the amount of removal of the supernatant was modified.

(2) To 100.0 g of water kept stirred, added was 1.4 g of agar powder (FUJIFILM Wako Pure Chemical Corporation) in small portions, dissolved under heating, and the mixture was then cooled.

(3) To 100.0 g of the water dispersion of cerium oxide kept stirred, added was 50.7 g of an aqueous agar solution at 50° C., mixed under stirring, the mixture was then cooled down to room temperature, to obtain a jelly agent B.

The thus prepared jelly agents A and B were placed in the mouth to evaluate the ingestion feel. Assuming a single dose of cerium oxide as 0.66 g, a single dose of the jelly agent A was determined to be 3.7 g, and of the jelly agent B to be 5.5 g.

Both of the jelly agents A and B, when placed singly in the mouth, were confirmed to be tasteless and odorless, typically without bitterness, irritation, and asperity, and also without rapid dry-up by absorption of saliva in the mouth. When evaluated inclusive of feeling of lingering in the mouth after spat out, the jelly agents were judged to be easily swallowed without water without chewing.

The OD tablet of the lanthanum carbonate preparation, when placed in the mouth, has been difficult to ingest without water, due to dry-up by absorption of saliva in the mouth. Hence, the jelly agent as one preferred mode of the present invention is obviously easier to ingest, than the OD tablet of the lanthanum carbonate preparation in Comparative Example.

[Example 7] Animal Experiment (2)

Example 7-1

Adenine nephropathy model rats were fed with a dispersion (cerium oxide dispersion) that contains cerium(III) ion as a cerium compound containing trivalent cerium, and cerium oxide.

Materials, feeds, and devices used for animal experiments are listed below.

[Materials, Feed, Equipment, etc.]
Rat: Slc:Wistar rat (male) delivered at 12 weeks of age (Japan SLC, Inc.)
Powder feed: AIN-93G powder feed (Funabashi Farm Co., Ltd.)
Feed for laboratory animal: Labo MR Stock (Nosan Corporation)
Adenine: (Tokyo Chemical Industry Co., Ltd.)
Cerium oxide dispersion: Cerium oxide dispersion prepared in [Preparation of Cerium Oxide Dispersion] (aqueous dispersion of cerium oxide with 10.0% by mass cerium oxide, mole ratio of cerium oxide:cerium (III)=9:1
Cerium(III) chloride: cerium(III) chloride heptahydrate (Nikki Corporation)
Water or hot water: water passed through a water purifier, and boiled in a pot
Mixer for feed preparation: Compact Kitchen Machine MUM4415JP (Bosch GmbH)
Manual sausage maker: sausage machine (COM4SPORT)
Wing blood collection needle for animal experiment: CL-4597 (CLEA Japan, Inc.)
[Preparation of Cerium Oxide Dispersion]

In a reaction vessel equipped with a stirrer, placed were 469.0 g of water, 229.072 g of cerium(III) chloride heptahydrate (Nikki Corporation), and 5.556 g of sodium acetate (FUJIFILM Wako Pure Chemical Corporation), and the aqueous solution with a cerium concentration of 1.15 mol/L was kept stirred at 20° C.

To the solution, 14.629 g of a 35.4% by mass hydrogen peroxide solution (FUJIFILM Wako pure Chemical Corporation) was added, and the content was kept stirred for 5 minutes.

Further, 350.542 g of a 4 mol/L aqueous sodium hydroxide solution (FUJIFILM Wako Pure Chemical Corporation) was added, and the content was kept stirred for 5 minutes.

The solution was then heated to 45° C. over 10 minutes, kept stirred for 60 minutes, and then cooled down to room temperature.

The final cerium concentration of the solution was found to be 0.7 mol/L.

Thereafter, the reaction solution was washed with water, filtered, and desalted to prepare an aqueous dispersion having a cerium oxide concentration of 10.0% by mass, and a molar ratio of cerium oxide and cerium(III) ion in the solution of 9:1 (cerium oxide dispersion, also simply referred to as dispersion, hereinafter). The molar ratio of cerium oxide and cerium(III) ion may be measured by inductively coupled plasma mass spectrometry (ICP-MS), or inductively coupled plasma atomic emission spectrometry (ICP-AES).

When the obtained particle was observed under a transmission electron microscope (TEM), an average particle size of cerium oxide was 4.0 nm.

[Preparation of Feeds]
(1) Feed for Normal Group
(i) Weighed was 250 g of a powder feed, which was then stirred with a kitchen machine.
(ii) After stirring with a kitchen machine for 3 minutes, the feed adhered on the wall surface was scraped off, and then stirred again for 3 minutes. Approximately 100 mL of hot water was then added evenly.
(iii) The feed was once put together by hands, and further kneaded with the kitchen machine until it became homogeneous.
(iv) The kneaded feed was shaped into a rod with a sausage machine.
(v) The shaped feed was cut into a cylindrical shape approximately 2.5 cm in diameter and 1.5 cm in thickness.
(vi) The shaped cylindrical feed was dried at 38° C. in an incubator for two days.
(vii) The feed was weighed to estimate a proportion of residual water content, and dried until the proportion drops to 10% or below.
(viii) The prepared feed was put in a zipper bag, and stored in a refrigerator.
The special feed was thus prepared by repeating steps (i) to (viii) necessary number of times.
(2) Feed for Adenine Group
A special feed was prepared by modifying step (ii) for preparing the feed for normal group, as described below. (ii) (Ade): While keeping the feed under stirring, 0.625 g of adenine was added in small portions, the content was stirred with a kitchen machine for 3 minutes, the feed adhered on the wall surface was scraped off, and the content was stirred again for 3 minutes. Approximately 100 mL of hot water was then added evenly.
(3-1) Feed for Adenine+Cerium Oxide Dispersion (A) Group
A special feed was prepared by modifying steps (i) and (ii) for (2) Feed for Adenine Group, as described below. (i) (Ade+Dispersion (A)): Weighed was 246.1 g of the powder feed, which was then stirred with a kitchen machine. (ii) (Ade+Dispersion (A)): While keeping the feed under stirring, 0.625 g of adenine was added in small portions, the content was stirred with the kitchen machine for 3 minutes, the feed adhered on the wall surface was scraped off, and the content was stirred again for 3 minutes. Next, while keeping the feed under stirring, 32.7 g of cerium oxide dispersion was added in small portions, the content was stirred with the kitchen machine for 3 minutes, the feed adhered on the wall surface was scraped off, and the content was stirred again for 3 minutes. Approximately 70 mL of hot water was then added evenly.
(3-2) Feed for Adenine+Cerium Oxide Dispersion (B) Group
A special feed was prepared by modifying steps (i) and (ii) for the adenine group, as described below.
(i) (Ade+Dispersion (B)): Weighed was 240.1 g of the powder feed, which was then stirred with the kitchen machine.
(ii) (Ade+Dispersion (B)): While keeping the feed under stirring, 0.625 g of adenine was added in small portions, the content was stirred with the kitchen machine for 3 minutes, the feed adhered on the wall surface was scraped off, and the content was stirred again for 3 minutes. Next, while keeping the feed under stirring, 98.2 g of cerium oxide dispersion was added in small portions, the content was stirred with the kitchen machine for 3 minutes, the feed adhered on the wall surface was scraped off, and the content was stirred again for 3 minutes. Approximately 12 mL of hot water was then added evenly.

[Breeding of Rats]
(1) Rats were weighed, and classified into four groups.
(2) Each group was acclimatized with MR stock feed, under ad libitum feeding and ad libitum water drinking. The feeding cage was conditioned at room temperature 22±2° C., under illumination 12 hours a day.
(3) After acclimatized, the animals were bred with any of the special feeds under ad libitum feeding and ad libitum water drinking. Feeding cages were conditioned in the same way as in the acclimatization period, at room temperature 22±2° C., under illumination 12 hours a day.
(4) On Days 0, 7, 14, 21, and 28, rats were bred in blood collection/metabolic cages for 24 hours.
The animals were fed with Labo MR stock on Day 0, and with the special feed on days thereafter, during which the amounts of feed consumption, water consumption, urine and feces were measured, and the urine and feces were sampled.
(5) The animals were taken out of the metabolic cages and weighed, followed by blood collection with a winged needle. Approximately 500 µL of blood was collected, the blood was incubated at room temperature for one hour, and then centrifuged (1,700×G, 20 min) to obtain serum.
Thereafter, (4) breeding in the metabolic cages, and (5) weight measurement and blood collection, were repeated.
(6) On the final Day 28, the animals were fasted throughout the day, and then dissected. The animals were subjected to laparotomy under anesthesia, and exsanguinated to death by collecting blood through the inferior vena cava. The obtained blood was incubated at room temperature for one hour, and then centrifuged (1,700×G, 20 min) to obtain serum. Also heparinized whole blood was collected, and centrifuged (1,700×G, 20 min) to obtain plasma.
Liver, kidney, spleen, small intestine, and stomach of the rats sacrificed by exsanguination were collected. The small intestine and stomach were dissected, removed contents, and rinsed twice with PBS.
Analysis of the collected blood sample was outsourced to Oriental Yeast Co., Ltd.
Analytical methods and analytical reagent for the individual test items will be listed below.
[Analyses of Blood Samples]
Serum creatinine (CRE): enzymatic method, L-type Wako CREM (FUJIFILM Wako Pure Chemical Corporation)
Blood urea nitrogen (BUN): urease-GLDH method, reagent from Oriental Yeast Co., Ltd. (Oriental Yeast Co., Ltd.)
Serum phosphorus (IP): enzymatic method, Determiner L IP II (Hitachi Chemical Diagnostics Systems Co., Ltd.)
Alanine aminotransferase (ALT): JSCC transferable method, L-type Wako ALTJ2 (FUJIFILM Wako Pure Chemical Corporation)
Serum albumin (ALB): BCG method, Albumin II HA-Test Wako (FUJIFILM Wako Pure Chemical Corporation)
These items were measured with use of Hitachi 7180 automatic analyzer.
FIGS. 12 to 15 illustrate graphs plotting on the ordinates test values of serum creatinine (CRE), blood urea nitrogen (BUN), serum phosphorus (IP), or alanine aminotransferase (ALT) of the blood samples collected at the time of the dissection, and plotting on the abscissae total molar amount of cerium per 100 g of feed.
As compared with the normal group fed with the feed for the normal group, the adenine group fed with the feed for the adenine group (total cerium concentration=0 mmol/100 g) was found to demonstrate elevated test values for CRE, BUN and IP, thus indicating depressed renal function, that is, onset of adenine nephropathy. ALT was found to be equivalent to that in the normal group.

The values for CRE, BUN, and IP were found to decrease as the cerium oxide content in the feed increased, proving that the degree of improvement in renal function tends to increase. ALT was found to largely vary at high content of cerium oxide, but remained almost unchanged up to a total cerium concentration of around 10 mmol/100 g.

From the results above, the dispersion liquid containing cerium(III) ion which represents the trivalent cerium compound, and cerium oxide was confirmed to be effective for assisting, maintaining, or improving the renal function.

Example 7-2

The adenine nephropathy model rats were fed with cerium (III) chloride heptahydrate as a cerium compound that contains trivalent cerium, to examine effect of the cerium compound that contains trivalent cerium according to the pharmaceutical composition of the present invention.

The effect of cerium(III) chloride was examined with use of the following feeds (4-1) to (4-3), in place of the (3-1) Feed for adenine+cerium oxide dispersion (A) group, and the (3-2) Feed for adenine+cerium oxide dispersion (B) group described in Preparation of Feeds according to Example 7-1.

(4-1) Feed for Adenine+Cerium Chloride (C) Group

A special feed was prepared by modifying steps (i) and (ii) (Ade) for the adenine group, as described below.

(i) (Ade+CeCl$_3$ (C)): Weighed was 248.8 g of the powder feed, which was then stirred with the kitchen machine.

(ii) (Ade+CeCl$_3$ (C)): While stirring the feed, 0.625 g of adenine was added in small portions, the feed was stirred with the kitchen machine for 3 minutes, the feed adhered on the wall surface was scraped off, and the content was stirred again for 3 minutes. Next, while stirring the feed, 10 mL of aqueous solution that contains 1.79 g of cerium(III) chloride heptahydrate dissolved therein was added in small portions, the content was stirred with the kitchen machine for 3 minutes, the feed adhered on the wall surface was scraped off, and the content was stirred again for 3 minutes. Approximately 90 mL of hot water was then added evenly.

(4-2) Feed for Adenine+Cerium Chloride (D) Group

A special feed was prepared by modifying steps (i) and (ii) (Ade) for the adenine group, as described below.

(i) (Ade+CeCl$_3$ (D)): Weighed was 247.7 g of the powder feed, which was then stirred with the kitchen machine.

(ii) (Ade+CeCl$_3$ (D)): While stirring the feed, 0.625 g of adenine was added in small portions, the content was stirred with the kitchen machine for 3 minutes, the feed adhered on the wall surface was scraped off, and the content was stirred again for 3 minutes. Next, while stirring the feed, 20 mL of aqueous solution that contains 3.58 g of cerium(III) chloride heptahydrate dissolved therein was added in small portions, the content was stirred with the kitchen machine for 3 minutes, the feed adhered on the wall surface was scraped off, and the content was then stirred again for 3 minutes. Approximately 80 mL of hot water was then added evenly.

(4-3) Feed for Adenine+Cerium Chloride (E) Group

A special feed was prepared by modifying steps (i) and (ii) (Ade) for the adenine group, as described below.

(i) (Ade+CeCl$_3$ (E)): Weighed was 245.3 g of the powder feed, which was then stirred with the kitchen machine.

(ii) (Ade+CeCl$_3$ (E)): While stirring the feed, 0.625 g of adenine was added in small portions, the content was stirred with the kitchen machine for 3 minutes, the feed adhered on the wall surface was scraped off, and the content was stirred again for 3 minutes. Next, while stirring the feed, 40 mL of aqueous solution that contains 7.17 g of cerium(III) chloride heptahydrate dissolved therein was added in small portions, the content was stirred with the kitchen machine for 3 minutes, the feed adhered on the wall surface was scraped off, and the content was stirred again for 3 minutes. Approximately 60 mL of hot water was then added evenly.

FIGS. 16 to 19 illustrate graphs plotting on the ordinates analytical values of serum creatinine (CRE), blood urea nitrogen (BUN), serum phosphorus (IP), or alanine aminotransferase (ALT) of the blood samples collected at the time of the dissection, and plotting on the abscissae the molar amount of cerium chloride per 100 g of feed.

Similar to Example 7-1, and as compared with the normal group fed with the feed for the normal group, the adenine group fed with the feed for the adenine group (cerium chloride concentration=0 mmol/100 g) was found to demonstrate elevated test values for CRE, BUN and IP, thus indicating depressed renal function, that is, onset of adenine nephropathy. ALT was found to be equivalent to that in the normal group.

The values for CRE, BUN, and IP were found to decrease as the cerium chloride content in the feed increased, proving that the degree of improvement in renal function tends to increase. ALT was found to be equivalent to that in the normal group.

For better understanding of differences in the effects between the cerium oxide dispersion and cerium chloride, FIGS. 20 to 23 illustrate test values for the cerium oxide dispersion-containing feed group, and test values for the cerium chloride-containing feed group, with the individual average values of the test values for the adenine group normalized at 100.

The cerium chloride-containing feed was found to decrease test values of all of CRE, BUN, and IP, with a smaller molar amount of cerium, as compared with the cerium oxide dispersion-containing feed. Use of cerium chloride was estimated to yield the effects approximately 4 to 9 times larger than that obtainable from the cerium oxide dispersion. On the other hand, ALT value was found to be equivalent to the level of the normal group, in both cases of using cerium chloride and the cerium oxide dispersion.

The results revealed that cerium(III) chloride heptahydrate, used as an example of the cerium compound that contains trivalent cerium according to the pharmaceutical composition of the present invention, has an effect of assisting, maintaining or improving the renal function. Cerium(III) chloride heptahydrate was also suggested to be more potent than the cerium oxide dispersion in, for example, assisting renal function.

The pharmaceutical product of the present invention, which contains a cerium compound having trivalent cerium as an active ingredient, may therefore be used for application of reducing, maintaining, or suppressing elevation, of the test values of serum creatinine (CRE), blood urea nitrogen (BUN), or serum phosphorus (IP), that is, application of improvement of renal function, or treatment of kidney disease.

[Example 8] Evaluation of In-Vivo Absorbability of Cerium in Cerium Oxide Dispersion The cerium oxide dispersion was fed to healthy mice, to evaluate the permeability into the blood. Explanations on the materials, feeds, devices and so forth used in the animal experiments, similar to those in Example 7, will be appropriately skipped.

[Preparation of Cerium Oxide Dispersion]

The cerium oxide dispersion was prepared according to the same procedures as in Example 7-1.

[Preparation of Feeds]

(1) Feed for Normal Group

Mice for the normal group were bred according to the same procedure as in Example 7-1.

(2) Feed for Cerium Oxide Dispersion Group

A special feed was prepared by modifying steps (i) and (ii) for the normal group in Example 7-1, as described below.

(i) (Dispersion): Weighed was 246.7 g of the powder feed, which was then stirred with the kitchen machine.

(ii) (Dispersion): The feed was stirred with the kitchen machine for 3 minutes, the feed adhered on the wall surface was scraped off, and the content was stirred again for 3 minutes. Next, while keeping the feed under stirring, 32.7 g of cerium oxide dispersion was added in small portions, the content was stirred with the kitchen machine for 3 minutes, the feed adhered on the wall surface was scraped off, and the content was stirred again for 3 minutes. Approximately 70 mL of hot water was then added evenly.

[Breeding of Rats]

The rats were bred by the same procedure as in Example 7-1, except that the rats were weighed and divided into two groups.

[Cerium Content Analysis of Blood and Organ Samples]

The blood, liver, and kidney collected from the cerium oxide dispersion group were treated by nitric acid dissolution and aqua regia dissolution to prepare sample solutions, and measured by inductively coupled plasma mass spectrometry (Agilent 7900 ICP-MS, from Agilent Technologies).

The measurement revealed the cerium contents per one gram of blood and the individual organs, as listed below.

Blood <0.0020 µg Ce/g blood
Liver 0.71 µg Ce/g liver
Kidney 0.29 µg Ce/g kidney

The results revealed that only a slight amount of cerium retained in the blood, meanwhile the cerium content per organ mass was found to be high in the liver and the kidney, in this order. Hence cerium is considered to be absorbed through the digestive tract into the body, after ingesting the cerium oxide dispersion.

[Example 9] Uremic Toxin Reducing Action by Cerium Oxide Dispersion

The adenine nephropathy model rats, to which the cerium oxide dispersion used in Example 7-1 was administered, were subjected to the steps up to [Breeding of Rats] in the same way as in Example 7-1, and the obtained plasma was subjected to measurement of the plasma uremic toxins (indoxyl sulfate, p-cresyl sulfate, phenyl sulfate, and trimethylamine-N-oxide (TMAO)).

Measurement of indoxyl sulfate, p-cresyl sulfate, phenyl sulfate, and trimethylamine-N-oxide (TMAO) was outsourced to LSI Medience Corporation.

Analyzers used in the individual test items are listed below.

Indoxyl sulfate, p-cresyl sulfate, phenyl sulfate: LCMS-8050, from Shimadzu Corporation Trimethylamine-N-oxide (TMAO): Agilent 6545 Q-TOF LC/MS, from Agilent Technologies, Inc.

FIGS. 24 to 27 illustrate graphs plotting plasma levels of indoxyl sulfate, p-cresyl sulfate, phenyl sulfate, and trimethylamine-N-oxide (TMAO) in the blood samples collected at the time of the dissection on the ordinates, and plotting total molar amount of cerium contained in 100 g of feed on the abscissae.

As compared with the normal group fed with the feed for the normal group, the adenine group fed with the feed for the adenine group (total cerium concentration=0 mmol/100 g) was found to demonstrate elevated levels of all of indoxyl sulfate, p-cresyl sulfate, phenyl sulfate, and trimethylamine-N-oxide (TMAO).

The levels of all of indoxyl sulfate, p-cresyl sulfate, phenyl sulfate, and trimethylamine-N-oxide (TMAO) were found to demonstrate declining tendency as the total cerium content in the feed increased.

Judging from the above, the cerium oxide dispersion was confirmed to be effective in reducing the blood uremic toxin. The results teach that the pharmaceutical composition of the present invention may be used for reducing, maintaining or suppressing elevation, of blood uremic toxin, that is, applicable as a uremic toxin reducing agent. It can be understood that cerium oxide and/or trivalent cerium ion, contained in the cerium oxide dispersion, contribute to reduction etc. of blood uremic toxin.

The results of Examples 8 and 9 also teach that cerium contained in the cerium oxide dispersion is adsorbed into the body, to presumably reduce the uremic toxin level in the blood of the subject to which the cerium oxide dispersion was administered.

INDUSTRIAL APPLICABILITY

The present invention may be used for treatment, prevention, and/or suppression of progress of kidney disease and secondary diseases associated therewith.

The invention claimed is:

1. A method for treating kidney disease, comprising orally administering a composition comprising a cerium salt comprising a cerium (III) salt selected from the group consisting of cerium (III) chloride, cerium (III) acetate, cerium (III) nitrate, cerium (III) citrate, cerium (III) carbonate, and hydrates and mixtures thereof, to a subject in need of treatment of kidney disease, wherein the administering does not include administering the cerium salt together with cerium oxide.

2. The method according to claim 1, wherein an amount of the cerium salt is in a range from 0.001 to 100% by mass relative to a total mass of the composition.

* * * * *